United States Patent
Odagawa et al.

(10) Patent No.: US 8,467,444 B2
(45) Date of Patent: Jun. 18, 2013

(54) INFORMATION PROCESSING SYSTEM, INFORMATION PROCESSING APPARATUS, INFORMATION PROCESSING METHOD, AND PROGRAM

(75) Inventors: Masayuki Odagawa, Yokohama (JP); Wataru Ochiai, Yokohama (JP); Akihiro Takamura, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 12/484,861

(22) Filed: Jun. 15, 2009

(65) Prior Publication Data

US 2009/0310670 A1   Dec. 17, 2009

(30) Foreign Application Priority Data

Jun. 16, 2008  (JP) .................... 2008-156992
Jul. 22, 2008  (JP) .................... 2008-189043
Jul. 22, 2008  (JP) .................... 2008-189044
Jul. 29, 2008  (JP) .................... 2008-195305

(51) Int. Cl.
  *H04N 7/12*   (2006.01)
  *H04N 11/02*  (2006.01)
  *H04N 11/04*  (2006.01)

(52) U.S. Cl.
  USPC ...... 375/240.01; 370/218; 370/352; 370/389; 370/465; 714/776; 382/218; 382/231; 382/233; 382/234

(58) Field of Classification Search
  USPC ......... 375/240.01–240.29; 714/776; 370/218, 370/352–356, 389, 465, 466; 386/200–362; 382/231, 233, 234
  See application file for complete search history.

(56) References Cited

U.S. PATENT DOCUMENTS

| | | | | |
|---|---|---|---|---|
| 5,610,841 | A | * | 3/1997 | Tanaka et al. .................. 725/115 |
| 5,805,228 | A | * | 9/1998 | Proctor et al. ............ 375/240.22 |
| 6,587,985 | B1 | * | 7/2003 | Fukushima et al. ........... 714/748 |
| 7,257,135 | B2 | * | 8/2007 | Sugahara ....................... 370/535 |
| 7,257,162 | B2 | * | 8/2007 | Viscito et al. ............. 375/240.25 |
| 7,298,741 | B2 | * | 11/2007 | Hung ............................. 370/389 |
| 2003/0016390 | A1 | * | 1/2003 | Yuasa .......................... 358/1.16 |
| 2004/0143661 | A1 | * | 7/2004 | Higashi et al. ................ 709/224 |
| 2008/0211825 | A1 | * | 9/2008 | Sunakawa et al. ............ 345/581 |

FOREIGN PATENT DOCUMENTS

| | | |
|---|---|---|
| JP | 08-205146 | 8/1996 |
| JP | 9-233425 A | 9/1997 |
| JP | 09-247670 | 9/1997 |
| JP | 09-307891 | 11/1997 |
| JP | 9-307891 A | 11/1997 |
| JP | 2001-119437 | 4/2001 |
| JP | 2004-104730 | 4/2004 |
| JP | 2005-217863 A | 8/2005 |
| JP | 2009-272945 | 11/2009 |

* cited by examiner

*Primary Examiner* — Sath V Perungavoor
*Assistant Examiner* — Nathnael Aynalem
(74) *Attorney, Agent, or Firm* — Fitzpatrick, Cella, Harper & Scinto

(57) ABSTRACT

An information processing system for performing processing of dividing a moving image into tiles and packetizing and outputting information corresponding to each tile includes a process time measuring packet generation unit adapted to generate and transmit a process time measuring packet in which a packet sending time is set to measure a packet process time, a packet process time measuring unit adapted to measure, based on the packet sending time set in the process time measuring packet and the reception time of the process time measuring packet, the packet process time necessary for processing a packet, a determination unit adapted to determine, based on the packet process time, the timestamp of the moving image divided into the tiles, and a packetization unit adapted to execute processing of packetizing and outputting the timestamp and the information of the moving image divided into the tiles.

11 Claims, 32 Drawing Sheets

F I G. 12
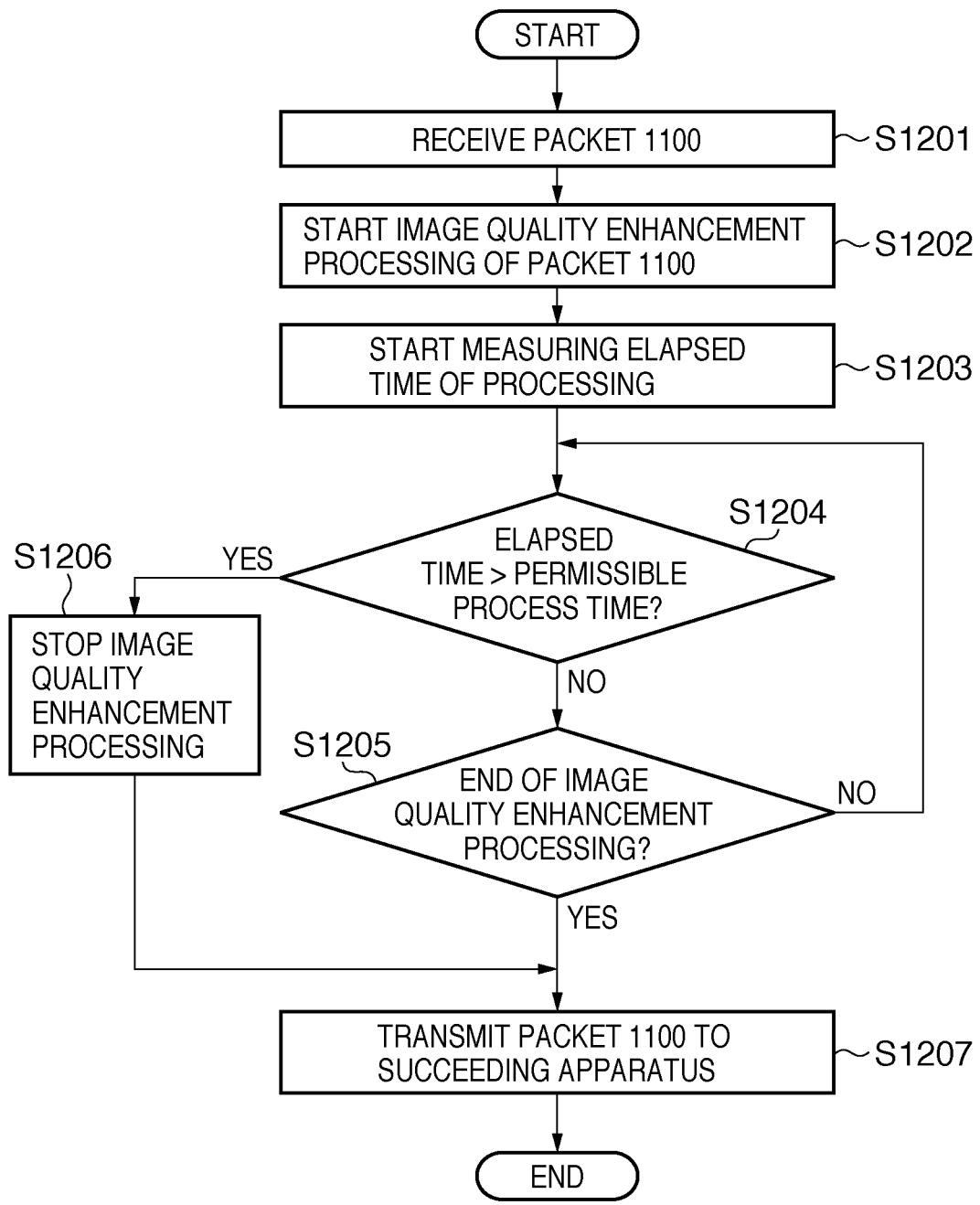

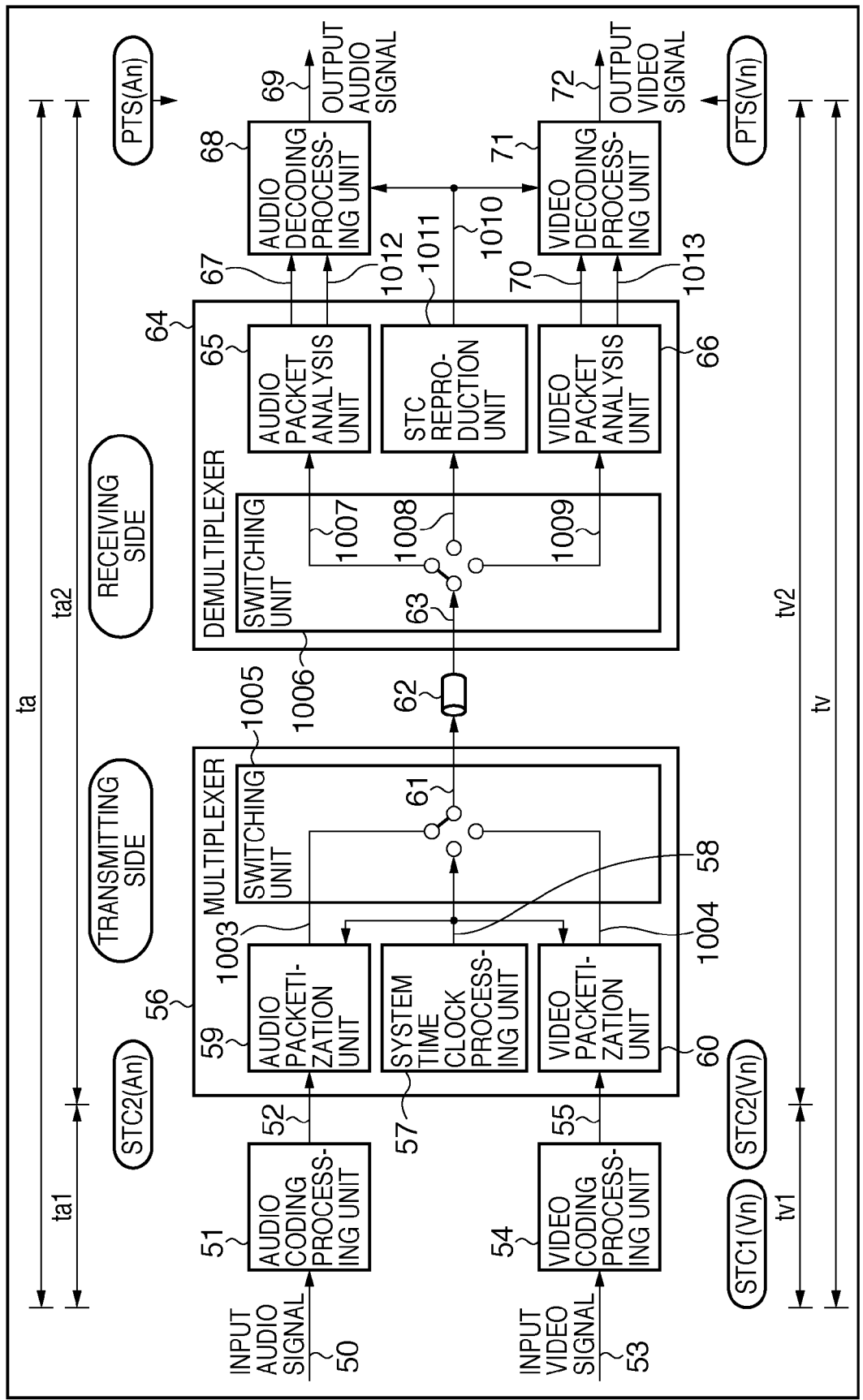
F I G. 29

INFORMATION PROCESSING SYSTEM, INFORMATION PROCESSING APPARATUS, INFORMATION PROCESSING METHOD, AND PROGRAM

BACKGROUND OF THE INVENTION

1. Field of the Invention

The present invention relates to an information processing technique and, more particularly, to an information processing technique of processing moving image data.

2. Description of the Related Art

A moving image compression/decompression transmission system for multiplexing and transmitting an audio signal and a video signal generally needs to cause its audio (sound) and video (image) signal processing units to output signals in synchronism.

To enable synchronization between an image and sound, MPEG2 and MPEG1, which are international standard coding methods, use output timing information (information of the output time of a moving image) called a timestamp (to be referred to as a "TS" hereinafter). The TSs include a presentation timestamp (to be referred to as a "PTS" hereinafter) and a decoding timestamp (to be referred to as a "DTS" hereinafter).

An MPEG system reproduces and outputs an audio signal or video signal when the STC (System Time Clock) of its decoder matches a PTS. The STC is defined by MPEG2 or MPEG1 to give reference time information. In either MPEG format, a DTS is provided in correspondence with the difference in the decoding order and reproduction output order, which is generated by sending I and P frames to a coded stream before a B frame. If the PTS matches the DTS, only the PTS is added as a timestamp.

MPEG2 uses a method of packetizing a plurality of packets in a variable length, like a PES (Packetized Elementary Stream) packet, and adding a timestamp to the video stream. In general, a stream formed by multiplexing the coded data of an audio signal (to be referred to as an "audio stream" hereinafter) and the coded data of a video signal (to be referred to as a "video stream" hereinafter) is called a system stream. The system stream is added with both the audio and video TSs.

Note that the TS is added with reference to an access unit for both the audio and video signals. For an audio signal access unit, a TS is added with reference to a syncword (a code arranged for every predetermined word in an audio stream). For a video signal access unit, a TS is added with reference to a picture start code (a code representing a break of pictures in a video stream). The DTS and PTS are added to the header of a PES packet.

FIG. 29 is a block diagram showing the schematic arrangement of a conventional moving image compression/decompression transmission system. The moving image compression/decompression transmission system is roughly divided into transmitting- and receiving-side systems. Referring to FIG. 29, on the transmitting side, an input audio signal 50 is input to an audio coding processing unit 51. The audio coding processing unit 51 codes the input audio signal 50 as an audio stream 52, and outputs the audio stream 52 to a multiplexer 56. An input video signal 53 is input to a video coding processing unit 54. The video coding processing unit 54 codes the input video signal 53 as a video stream 55, and outputs the video stream 55 to the multiplexer 56.

The audio stream 52 and video stream 55 input to the multiplexer 56 are multiplexed into a system stream 61 and output to a transmission path 62.

The multiplexer 56 includes a system time clock (STC) processing unit 57, audio packetization unit 59, video packetization unit 60, and switching unit 1005.

The audio packetization unit 59 forms packets by separating the received audio stream 52 at a predetermined length, and outputs data 1003 to the switching unit 1005. The switching unit 1005 selects each packet and multiplexes it into the system stream 61. At this time, if data length packetized in the audio stream 52 includes a syncword, a TS is added to the header portion of the packet. Note that the TS is obtained based on STC data 58 from the system time clock processing unit 57.

The video packetization unit 60 also forms packets by separating the received video stream 55 at a predetermined length, and outputs data 1004 to the switching unit 1005. The switching unit 1005 selects each packet and multiplexes it into the system stream 61. At this time, if data length packetized in the video stream 55 includes a picture start code, a TS is added to the header portion of the packet. Note that the TS is obtained based on the STC data 58 from the system time clock processing unit 57.

To enable STC reproduction on the receiving side, the switching unit 1005 periodically selects the STC data 58 and multiplexes it into the system stream 61. Next, on the receiving side, a system stream 63 transmitted via the transmission path 62 is input to a demultiplexer 64 and demultiplexed. The system stream 63 is demultiplexed into an audio stream 67, audio TS 1012, video stream 70, video TS 1013, and STC data 1010 and output.

The demultiplexer 64 includes a switching unit 1006, STC reproduction unit 1011, audio packet analysis unit 65, and video packet analysis unit 66. The switching unit 1006 outputs, from the system stream 63, audio packet data 1007 to the audio packet analysis unit 65, video packet data 1009 to the video packet analysis unit 66, and STC data 1008 to the STC reproduction unit 1011.

The audio packet analysis unit 65 analyzes the received audio packet data 1007, separates it into the audio stream 67 and audio TS 1012, and outputs them to an audio decoding processing unit 68. The video packet analysis unit 66 analyzes the received video packet data 1009, separates it into the video stream 70 and video TS 1013, and outputs them to a video decoding processing unit 71.

The STC reproduction unit 1011 reproduces the STC data 1010 from the received STC data 1008 to always output the same data as the STC data 58 output from the system time clock processing unit 57 on the transmitting side. The STC reproduction unit 1011 outputs the STC data 1010 to the video decoding processing unit 71 and the audio decoding processing unit 68. The audio decoding processing unit 68 decodes the received audio stream 67 with reference to the audio TS 1012 and STC data 1010, and outputs an output audio signal 69 at a time corresponding to the TS.

The video decoding processing unit 71 decodes the received video stream 70 with reference to the video TS 1013 and STC data 1010, and outputs an output video signal 72 at a time corresponding to the TS.

The output operation of each decoding processing unit based on the TS will be described next in detail. The output operation based on the TS is implemented by causing the audio decoding processing unit 68 and the video decoding processing unit 71 to output corresponding data portions when the value of the PTS matches the value of the STC data of each of the audio and video signals.

For example, the value of a PTS corresponding to a syncword An in the audio stream 67 is represented by be PTS (An). When the value of the STC data 1010 matches PTS (An), the audio decoding processing unit 68 outputs decoded data corresponding to the syncword An.

Similarly, the value of a PTS corresponding to a picture start code Vn in the video stream 70 is represented by be PTS (Vn). When the value of the STC data 1010 matches PTS (Vn), the video decoding processing unit 71 outputs decoded data corresponding to the picture start code Vn.

Assume that in the moving image compression/decompression transmission system shown in FIG. 29, a time ta elapses from input of the input audio signal 50 to the audio coding processing unit 51 on the transmitting side to output of the output audio signal 69 from the audio decoding processing unit 68 on the receiving side. Similarly, assume that a time tv elapses from input of the input video signal 53 to the video coding processing unit 54 on the transmitting side to output of the output video signal 72 from the video decoding processing unit 71 on the receiving side.

In this case, to ensure synchronization between the video and audio signals, the process time of the transmission processing system is set to make the times from input to output satisfy ta=tv, and the PTS times are set based on the process time. TS calculation in the audio packetization unit 59 and the video packetization unit 60 included in the multiplexer 56 will be described next.

Assume that out of the time ta from input to output of the audio signal, the time until input to the multiplexer 56 is ta1, and the remaining time is ta2. Also assume that data to be packetized in the audio stream 52 input to the multiplexer 56 contains a syncword An. If the value of the STC data 58 when adding a TS to the header portion of the packet is TC2(An), PTS(An) is obtained by $$PTS(An)=STC2(An)+ta2 \quad (1)$$

For the video as well, assume that out of the time tv from input to output of the video signal, the time until input to the multiplexer 56 is tv1, and the remaining time is tv2. Also assume that data to be packetized in the video stream 55 input to the multiplexer 56 contains a picture start code Vn. If the value of the STC data 58 when adding a TS to the header portion of the packet is TC2(Vn), PTS(Vn) is obtained by $$PTS(Vn)=STC2(Vn)+tv2 \quad (2)$$

However, as for a video signal, the video coding processing unit 54 converts it into a variable length code or changes the order of pictures. For this reason, tv1 varies depending on the coding condition. Hence, tv2 also varies (because tv is fixed, and tv2=tv−tv1), and tv2 to be added to STC2(Vn) cannot be preset. It is therefore impossible to obtain the PTS in the same way as in the audio signal. In a video signal, the order of pictures changes. Hence, a DTS must be obtained, too.

Picture order change will be explained here with reference to the schematic view in FIG. 30. In FIG. 29, a delay time associated with picture order change is taken into consideration, though other process times and the like are omitted. Referring to FIGS. 30, 30*a* indicates the input video signal 53 input to the video coding processing unit 54; 30*b*, the video stream 55 output from the video coding processing unit 54 (or the video stream 70 output from the video packet analysis unit 66); and 30*c*, the output video signal 72 output from the video decoding processing unit 71. Symbols I, P, and B added to all signals represent picture coding types defined by MPEG2 and MPEG1. In the example shown in FIG. 30, the picture interval of I and P frames is 3. The picture interval of I and P frames is generally called an M value (M value=3 in the example of FIG. 30). Parenthesized numerical values on the respective signals are temporal reference values representing the picture sequence in the input video signal 53.

Picture order change is done in the following way. In the input video signal 53 indicated by 30*a*, only the B frames are sequentially delayed and inserted next to the succeeding I or P frame to change the order of the pictures, thereby forming the video stream 55 indicated by 30*b*. The changed state is the same as in the video stream 70.

Next, the video decoding processing unit 71 conversely sequentially delays and inserts the I and P frames of the video stream 70 next to the succeeding consecutive B frames to restore the original order, thereby obtaining the output video signal 72 having the original order, as indicated by 30*c*. Causing the video decoding processing unit 71 to restore the original order is called reorder.

FIG. 31 shows the relationship between the PTS and DTS in the reorder of the video decoding processing unit 71. This will be explained. The video stream 70 input to the video decoding processing unit 71 is stored in a video decoding buffer 73 to absorb the variation on the time axis generated by variable length coding, and then output to a video decoding circuit 75 as a video stream 74. The video decoding circuit 75 decodes the received video stream 74 into data 76.

The B frame portion of the data 76 is directly output as the output video signal 72. On the other hand, the I of P frame portion of the data 76 is delayed by a video reorder buffer 77 and becomes data 78. The data 76 and 78 are output as the output video signal 72 via a switching unit 79. Switching between the data 76 and 78 is done by the switching unit 79. The delay time in the video reorder buffer 77 is (M value×picture cycle). The processing of the video decoding processing unit 71 enables to restore the original order of pictures.

Referring to FIG. 31, the PTS represents the output time of the output video signal 72 from the video decoding processing unit 71. On the other hand, the DTS represents the output wait time of the video stream 74 from the video decoding buffer 73. In MPEG2 and MPEG1, the process time of the video decoding circuit 75 is assumed to be zero in the definition of TS. For this reason, for a B frame, DTS=PTS.

Hence, the PTS and DTS are added to I and P frames, whereas only the PTS is added to a B frame (since DTS=PTS). As described above, TS addition to a video signal is more complex than for an audio signal.

FIG. 32 shows a structural example in which the picture start code, temporal reference, and picture coding type used in the above explanation are added to the video stream 55 in FIG. 29. This is an example of MPEG. As shown in FIG. 32, a coded data portion corresponding to each frame or field of the input video signal 53 (FIG. 29) is called a picture layer and starts with a picture start code that is a unique 32-bit value. A 10-bit temporal reference follows the code. A 3-bit picture coding type exists next to the temporal reference.

A header such as 16-bit video delay time control information (video buffering verifier delay: vbv_delay) is added then, and actual coded data follows the header. The video delay time control information represents a delay time in the buffer (video decoding buffer 73) in the video decoding processing unit 71 necessary for receiving variable-length-coded data at a predetermined rate as its average rate and decoding the data. Buffer read-access control is performed based on the video delay time control information, thereby avoiding underflow or overflow of the buffer.

The video delay time control information is generated and added inside the video coding processing unit 54. At this time, the video delay time control information is generally calculated and generated for each picture based on the capacity of the buffer in the video decoding processing unit 71 on the receiving side, the code amount that is the compression result of each picture, and the average rate. In MPEG2, the video delay time control information is called vbv_delay, and the buffer is called a VBV buffer.

A conventional TS calculation method will be described next. FIG. 33 is a view showing the functional arrangement of a conventional timestamp adding apparatus. The video coding processing unit 54 includes an encoder 54a, encoder-side vbv buffer 54b, and output unit 54c. The video packetization unit 60 includes a packet buffer 60a, timestamp adding unit 60b, timestamp calculation unit 60c, and system time clock buffer 60d.

The input video signal 53 is variable length data and is input at a variable transmission rate. In the transmission path of the system, transmission is normally done at a predetermined rate. To ensure a predetermined transmission rate in the transmission path between the video coding processing unit 54 and the multiplexer 56, the encoder-side vbv buffer 54b is necessary. Using the STC upon inputting the input video signal 53 to the video coding processing unit 54, the timestamp calculation unit 60c generates a timestamp. At this time, the video signal requires a process time to some extent (several ten msec) for signal processing. The above-described picture order change increases the delay in coding processing until use for STC value calculation. To buffer the delay, the system time clock buffer 60d is provided.

The packet buffer 60a temporarily holds data to be added with a timestamp and packetized. The packet buffer 60a synchronizes data input to the timestamp adding unit 60b with the input of the timestamp generated by the timestamp calculation unit 60c to the timestamp adding unit 60b, thereby adjusting the timestamp addition timing. Hence, data input from the packet buffer 60a to the timestamp adding unit 60b is done at a predetermined rate.

The above-described conventional technique is disclosed in, for example, Japanese Patent Laid-Open No. 9-307891.

In the prior art, the process time of, for example, video quality enhancement processing is not taken into consideration. If data is too late for the time represented by the timestamp, the image is disordered. If data arrives before the actual timestamp, a buffer for holding data is necessary. For this reason, if the difference between the timestamp and the data arrival time is large, a very large buffer area must be allocated.

In the above-described system, a packet processing apparatus is sometimes arranged between the packet transmitting-side apparatus and the packet receiving-side apparatus. In this case, the process time varies depending on the state of the packet processing apparatus. For this reason, the packet receiving-side apparatus may be unable to output video data at the time represented by the timestamp, resulting in disorder in the image. This phenomenon is called underflow. On the other hand, if the timestamp is set too late, the capacity of packets to be held by the packet receiving-side apparatus may increase, resulting in buffer overflow.

Japanese Patent Laid-Open No. 9-233425 has proposed a technique of, if decoding processing is interrupted in a display apparatus that has received video data, re-executing the decoding processing to prevent disorder of display. However, this method does not necessarily allow display at a time designated by a timestamp.

Japanese Patent Laid-Open No. 2005-217863 has proposed an IP telephone terminal apparatus which causes a transmission apparatus to adjust, for example, the packet transmission interval based on the packet reception time of a reception apparatus. As for video data, however, the frames need to be displayed at a predetermined interval. It is therefore impossible to prevent underflow or overflow only by simple transmission interval adjustment.

SUMMARY OF THE INVENTION

The present invention has been made in consideration of the above-described problems. The present invention provides an information processing technology which can eliminate disorder in an image by suppressing any data arrival after a timestamp by predicting a time required for image processing such as video quality enhancement processing and predicting a data arrival time at a video output unit.

The present invention provides an information processing technology which can decrease a necessary buffer area capacity by reducing the amount of data that arrives before a timestamp.

The present invention provides an information processing technology which can prevent disorder in a video or sound caused by packet underflow or buffer overflow.

According to one aspect of the present invention, there is provided an information processing system for performing processing of dividing a moving image into tiles and packetizing and outputting information corresponding to each tile, comprising: a process time measuring packet generation unit adapted to generate and transmit a process time measuring packet in which a packet sending time is set to measure a packet process time; a packet process time measuring unit adapted to receive the process time measuring packet and measure, based on the packet sending time set in the process time measuring packet and a reception time of the process time measuring packet, the packet process time necessary for processing a packet; a determination unit adapted to determine, based on the packet process time, a timestamp of the moving image divided into the tiles; and a packetization unit adapted to execute processing of packetizing and outputting the timestamp and information of the moving image divided into the tiles.

According to the present invention, it is possible to eliminate disorder in an image by suppressing any data arrival after a timestamp by predicting a time required for image processing such as video quality enhancement processing and predicting a data arrival time at the final stage serving as a video output unit.

The amount of data that arrives before a timestamp can be prevented from increasing. It is therefore possible to decrease a necessary buffer area.

According to the present invention, it is possible to prevent disorder in a video or sound caused by underflow or buffer overflow. This allows efficient use of a hardware resource such as a buffer size.

Further features of the present invention will become apparent from the following description of exemplary embodiments with reference to the attached drawings.

BRIEF DESCRIPTION OF THE DRAWINGS

FIG. 12 is a flowchart for explaining an example of the operation of the information processing apparatus 800 according to the third embodiment of the present invention;

FIG. 29 is a block diagram showing the schematic arrangement of a conventional moving image compression/decompression transmission system;

DESCRIPTION OF THE EMBODIMENTS

Embodiments of the present invention will now be described in detail with reference to the accompanying drawings. Note that the constituent elements described in the embodiments are merely examples. The technical scope of the present invention is determined by the scope of the appended claims and is not limited by the following individual embodiments.

First Embodiment

Figure 1:
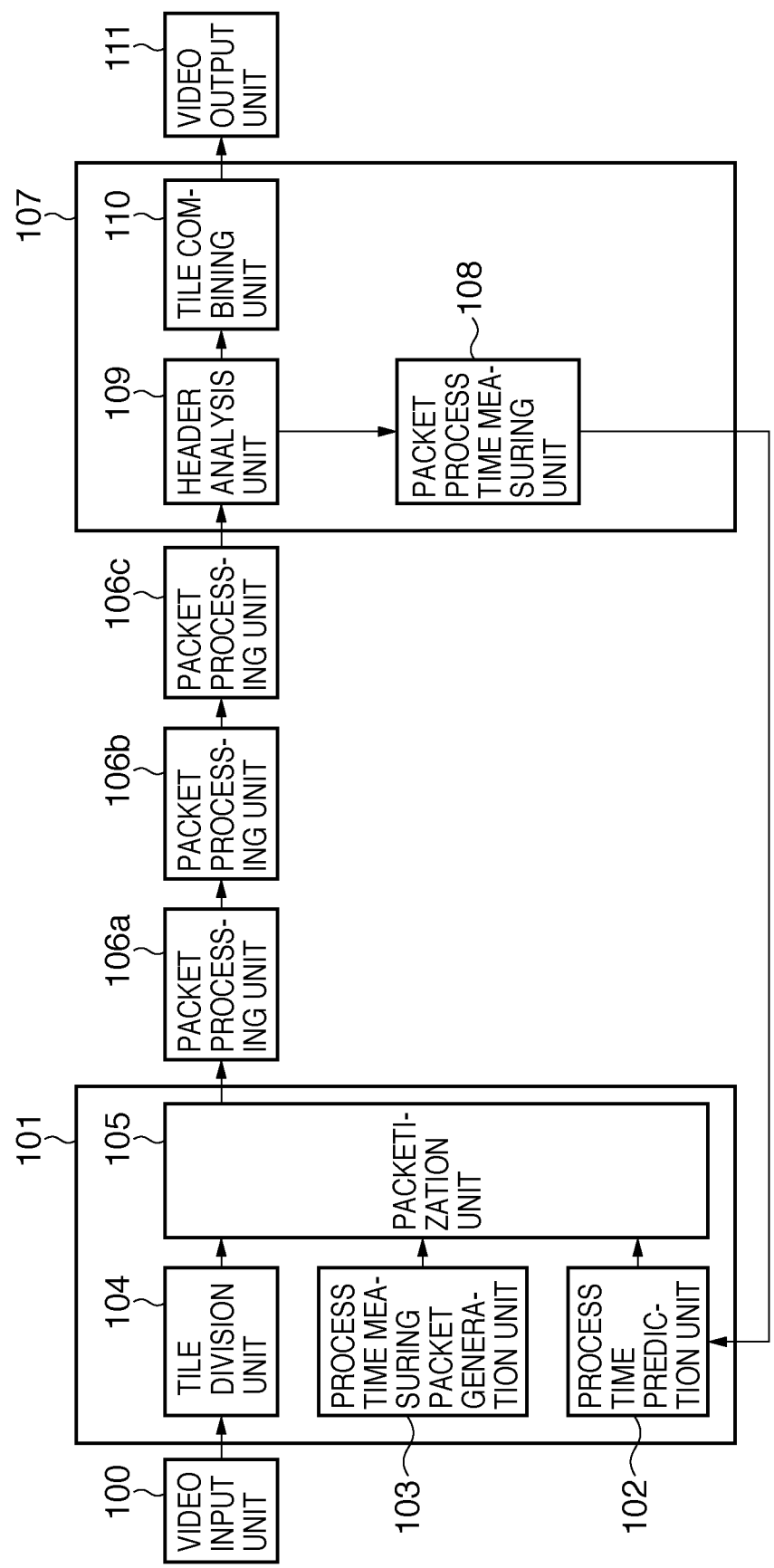
FIG. 1 is a block diagram showing the arrangement of a moving image processing system according to the first embodiment of the present invention.

FIG. 1 is a block diagram showing the arrangement of an information processing system (to also be referred to as a "moving image processing system" hereinafter) according to the first embodiment of the present invention. The moving image processing system can divide a moving image into tiles, and packetize and process information corresponding to each divided tile. A video input unit 100 is connected to a tile division unit 104 in a packet generation unit 101. The packet generation unit 101 receives video data from the video input unit 100 and generates packets. The packet generation unit 101 includes the tile division unit 104, a process time measuring packet generation unit 103, a process time prediction unit 102, and a packetization unit 105.

The tile division unit 104 is connected to the packetization unit 105. The tile division unit 104 receives video data from the video input unit 100 and divides it into tiles. This embodiment will be explained assuming that video data is divided into tiles each including, for example, 8 pixels×128 pixels. In the present invention, the tile division size is not limited to this example, as a matter of course.

The process time measuring packet generation unit 103 is connected to the packetization unit 105. The process time measuring packet generation unit 103 generates a process time measuring packet to measure a packet process time.

Figure 5:
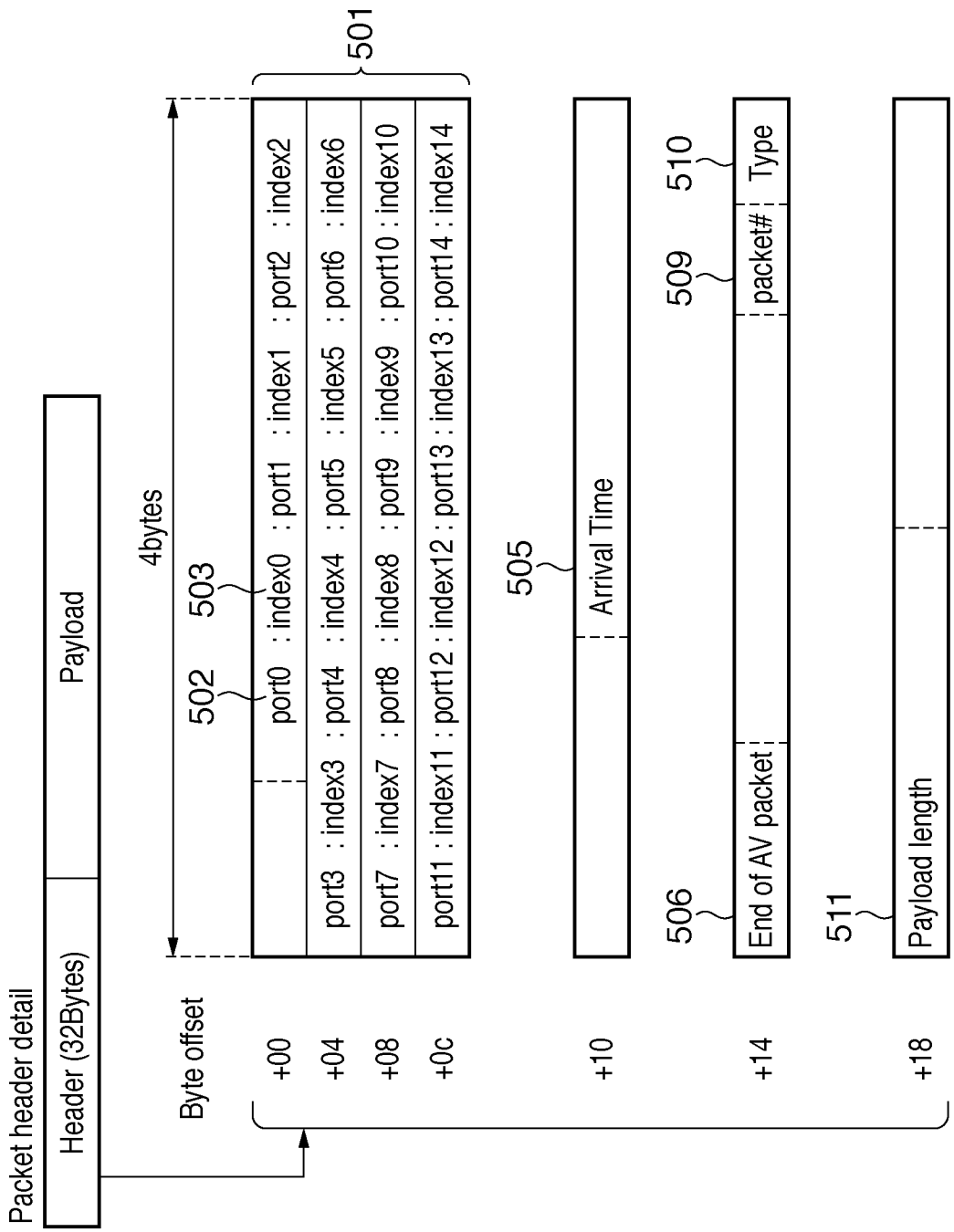
FIG. 5 is a view showing the structure of header information.
Figure 7:
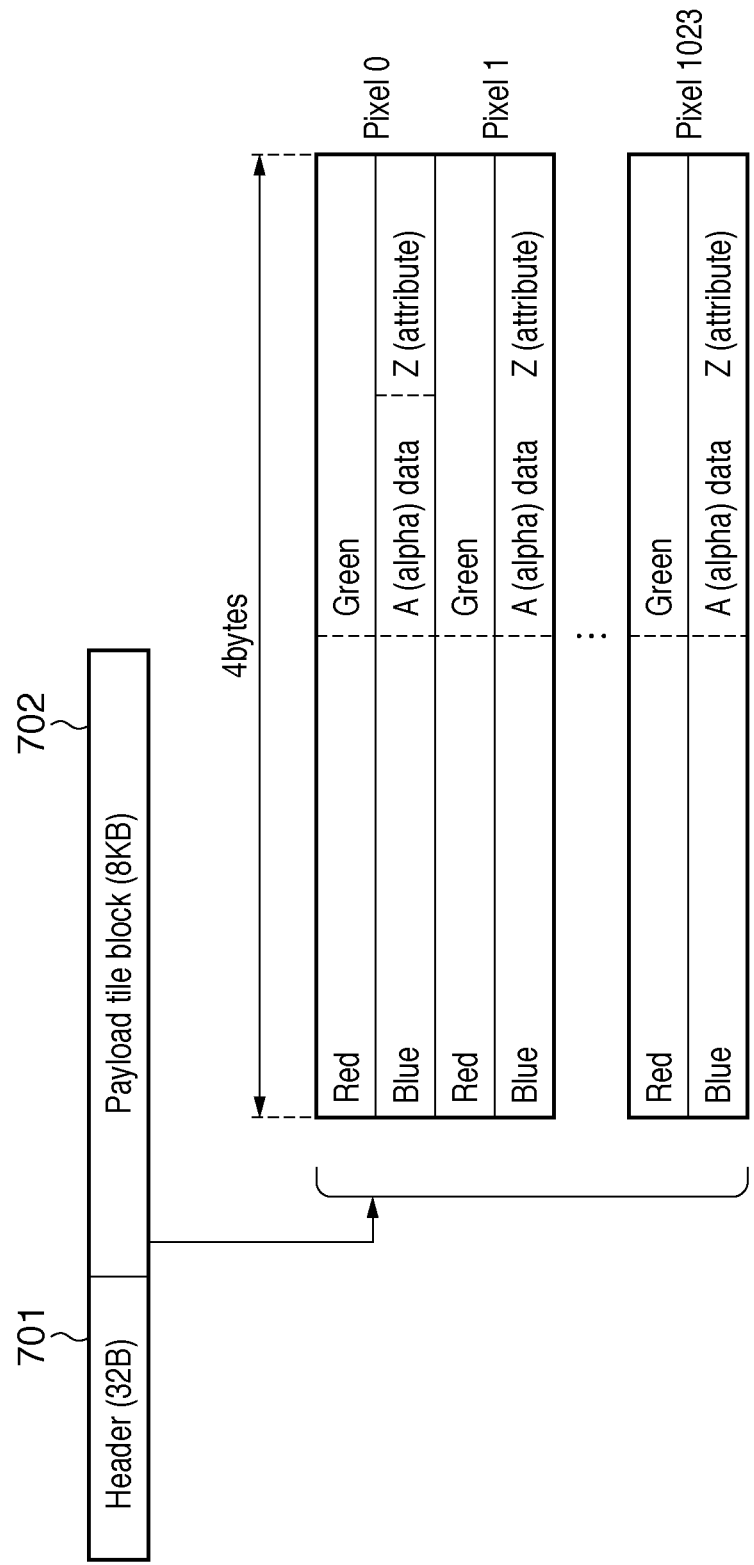
FIG. 7 is a view showing the structure of a video tile packet and a process time measuring packet.

FIG. 7 is a view showing the structure of a packet. A packet has a header 701 and a payload tile block 702. The process time measuring packet generation unit 103 generates data in the packet (generates data in the payload tile block 702), and outputs it to the packetization unit 105. The packetization unit 105 adds header information (header 701) and sends the packet. FIG. 5 is a view showing the structure of header information. The packetization unit 105 sets a packet sending time in an Arrival Time 505. A packet reception unit 107 receives the sent packet. A packet process time measuring unit 108 measures the packet arrival time. The difference between the packet arrival time and the packet sending time set in the Arrival Time 505 of the header information is a packet process time Tp.

The process time prediction unit 102 is connected to the packetization unit 105 and the packet process time measuring unit 108 in the packet reception unit 107. The process time prediction unit 102 determines a timestamp (Arrival Time 505) to be added to the header information based on the input from the packet process time measuring unit 108. The process time prediction unit 102 receives the packet process time Tp measured by the process time measuring packet from the packet process time measuring unit 108. The process time prediction unit 102 adds the packet process time Tp, a maximum permissible error time Tm including a fluctuation of time necessary for packet processing, and a packet sending time Tsend, thereby determining a timestamp Ts in accordance with $$Ts(\text{timestamp}) = Tp(\text{packet process time}) + Tm(\text{maximum permissible error}) + Tsend(\text{sending time}) \quad (3)$$

The packetization unit 105 receives inputs from the tile division unit 104, process time measuring packet generation unit 103, and process time prediction unit 102, adds a packet header, generates a command packet, and sends the packet to a packet processing unit 106a.

The packet processing units 106a, 106b, and 106c receive a packet as an input. Upon receiving a command packet, each packet processing unit accesses a register in accordance with the description in the packet. Upon receiving a video tile packet and a process time measuring packet, each packet processing unit processes video tile data in the packet in accordance with register settings.

The packet reception unit 107 includes a header analysis unit 109, the packet process time measuring unit 108, and a tile combining unit 110. The packet reception unit 107 receives an input from the packet processing unit 106c and outputs video data to a video output unit 111. The header analysis unit 109 receives a packet from the packet processing unit 106c and analyzes header information. If the received packet is a command packet, the header analysis unit 109 discards the packet without any processing. Upon receiving a video tile packet, the header analysis unit 109 separates header information and video tile data and outputs the video tile data to the tile combining unit 110. Upon receiving a process time measuring packet, the header analysis unit 109 outputs header information to the packet process time measuring unit 108 and discards remaining data.

The packet process time measuring unit 108 is connected to the header analysis unit 109 and the process time prediction unit 102 in the packet generation unit 101. The packet process time measuring unit 108 receives the output from the header analysis unit 109 and measures, as the packet process time, the difference between the packet arrival time and the packet sending time set in the Arrival Time 505 of the header information. The packet process time measuring unit 108 notifies the process time prediction unit 102 of the measured packet process time.

The tile combining unit 110 decompresses video data by combining video tile data each having 8 pixels×128 pixels. The combined video data is output to the video output unit 111. The video output unit 111 is connected to the tile combining unit 110 in the packet reception unit 107 to receive video data from the tile combining unit 110 and output the video data to a display screen.

Details of packet formats according to this embodiment will be described next. The moving image processing system according to the embodiment of the present invention transfers video data, and commands and parameters to the video processing unit in a packet format. In this embodiment, an example will be explained in which video data is divided into tiles each having, for example, 8 pixels×128 pixels, and processed. In this embodiment, three kinds of packets, command packet, video tile data packet, and process time measuring packet are used.

FIG. 5 is a view showing the structure of a packet header. The packet header is common to all packets. A next input port & parameter index 501 represents the data path in a packet processing unit 106. The next input port & parameter index 501 is set in the processing order from the left end. Each packet processing unit 106 shifts the next input port & parameter index 501 by eight bits after processing. The next input port & parameter index 501 stores 14 sets of ports 502 and indices 503. The port 502 indicates the input port number of the next processing unit. The index 503 represents the number of a static parameter to be used by each processing unit.

In a video tile packet, the Arrival Time 505 represents a time to start displaying, on the screen, image tile data included in a packet. In a process time measuring packet, the Arrival Time 505 represents a time to send a packet. In a command packet, the Arrival Time 505 is an insignificant field. An end of AV packet 506 indicates that a packet tile block included in one frame ends with the packet. A packet#509 represents the packet number in the frame. The start packet of a frame is 0, and the packet# is incremented by one in every packet. A type 510 represents a packet type. There are three kinds of packets, command packet, video tile data packet, and process time measuring packet. A payload length 511 represents the number of bytes of the payload.

Figure 6:
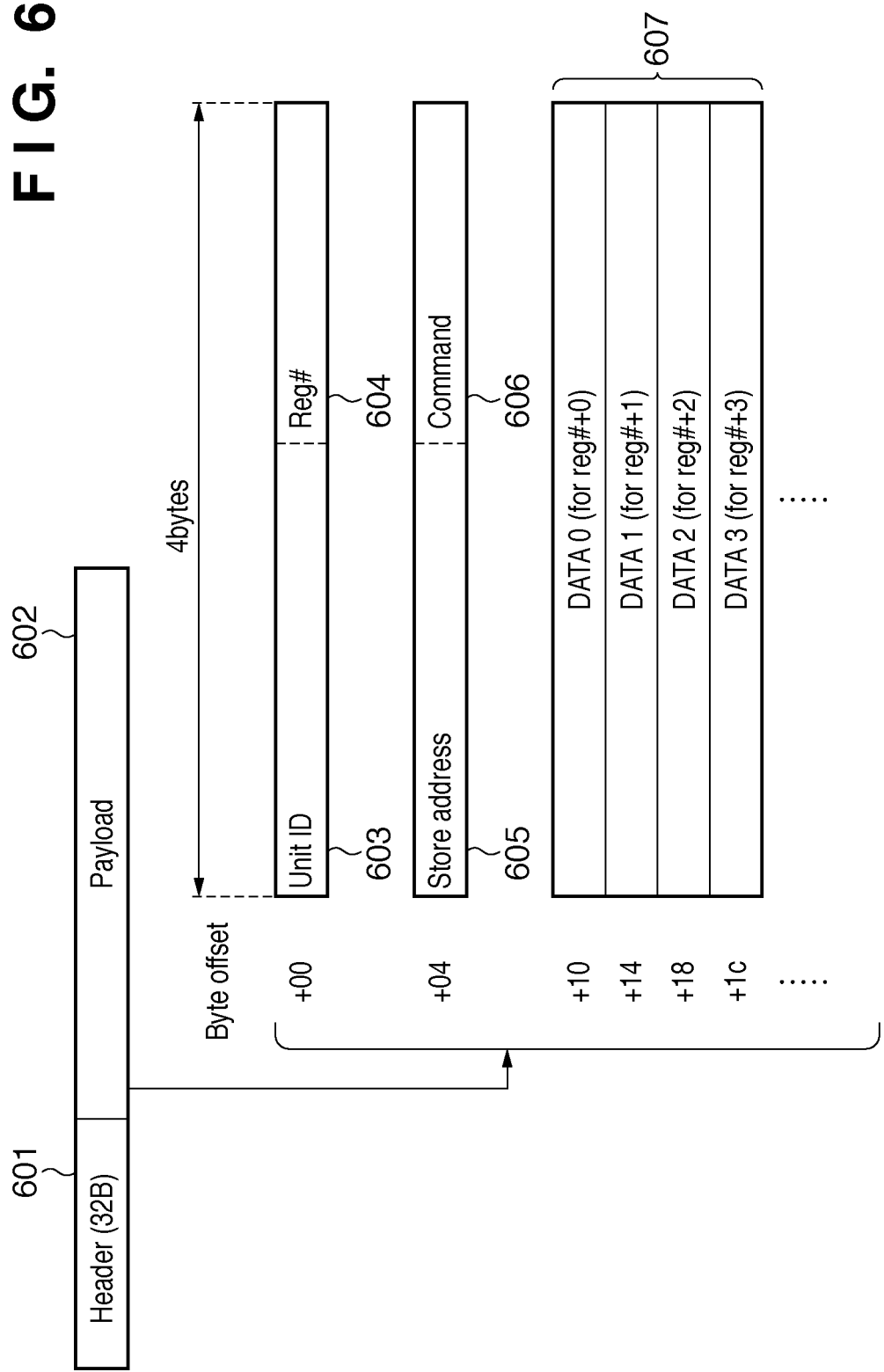
FIG. 6 is a view showing the structure of a command packet.

FIG. 6 is a view showing the structure of a command packet. A command packet includes a header 601 and a payload parameter 602. A command packet is used for register access to a processing unit for processing a video tile packet.

Information included in the payload parameter 602 will be described below. A unit ID 603 represents the ID of a target out of the packet processing units 106a, 106b, and 106c. A reg #604 indicates the number of a target register in the packet processing units 106a, 106b, and 106c. A store address 605 indicates the storage location of read data upon register read of the target packet processing unit 106. A command 606 represents a command to the target packet processing unit 106. There are two kinds of commands, write and read. When the command represented by the command 606 is a write command, a data field 607 stores write data. When the command represented by the command 606 is a read command, the data field 607 stores read data.

FIG. 7 is a view showing the structure of a video tile packet and a process time measuring packet. Each of a video tile packet and a process time measuring packet includes the header 701 and the payload tile block 702. The payload tile block 702 stores video data including 8 pixels×128 pixels. The size of the payload is 8 Kbytes. The size of each pixel data is 8 bytes. Each pixel data includes RGB data each expressed by 16 bits of Adobe RGB, 8-bits A ($\alpha$) data, and 8-bits Z data. In a video tile packet, the payload tile block 702 stores a tile of video data divided by the tile division unit 104. In a process time measuring packet, the payload tile block 702 stores data generated by the process time measuring packet generation unit 103.

Figure 2:
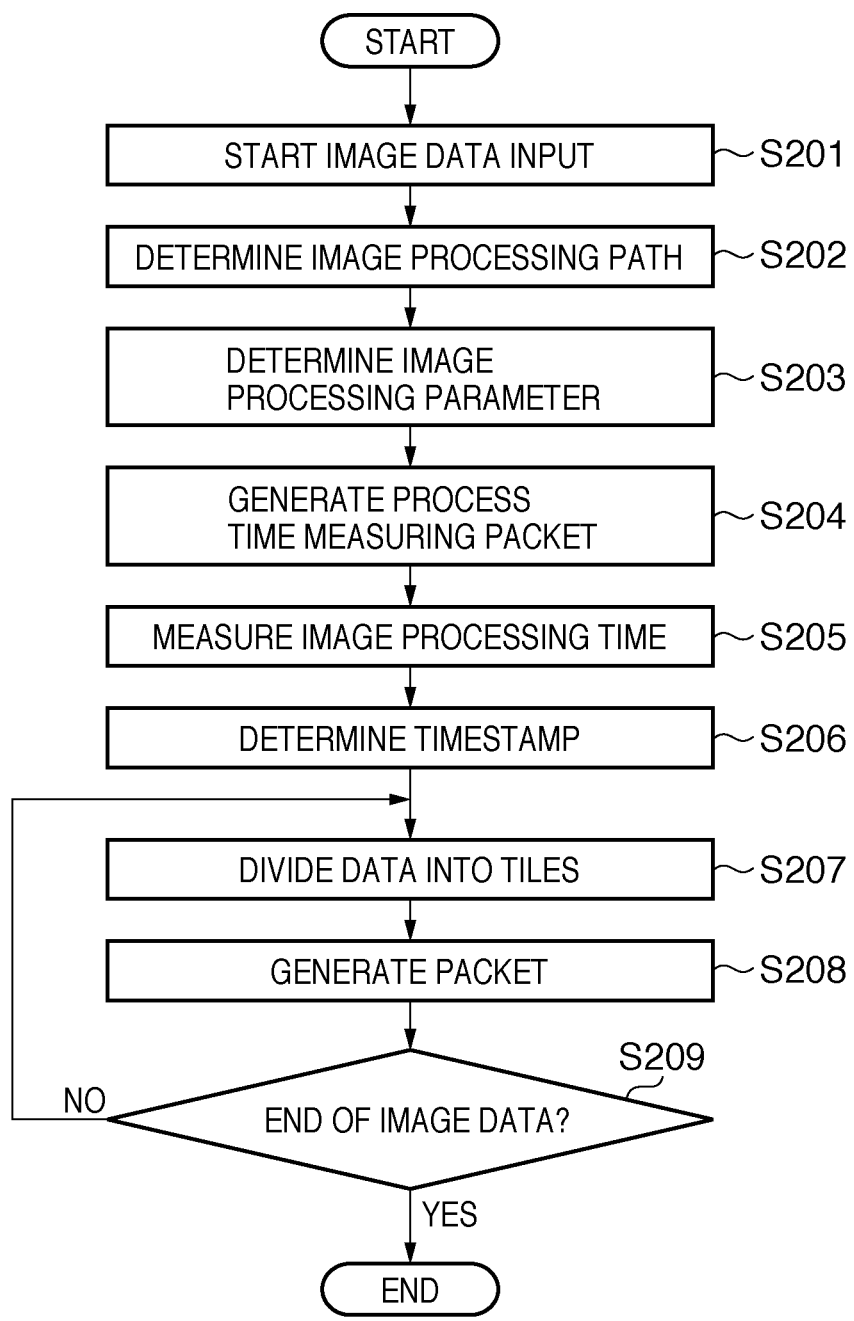
FIG. 2 is a flowchart for explaining the operation of the moving image processing system according to the first embodiment of the present invention.

The operation of the moving image processing system according to the first embodiment of the present invention will be described next with reference to FIG. 2. In step S201, the video input unit 100 starts inputting video data. In step S202, the packet generation unit 101 determines the process path. In this embodiment, since a packet is sent in a single direction and never returns from the sending destination, the process path is uniquely determined. When the process path is determined, the next input port & parameter index 501 in the header information is determined.

In step S203, the packet generation unit 101 determines process parameters in the packet processing units 106a, 106b, and 106c. The packet generation unit 101 generates command packets to the packet processing units 106a, 106b, and 106c in accordance with the determined parameter values, and sends the command packets.

In step S204, the process time measuring packet generation unit 103 generates data in a process time measuring packet. The generated data can have a random value. The packetization unit 105 sets the packet sending time in the Arrival Time 505 of the header information, and transmits the packet.

In step S205, the packet reception unit 107 receives the process time measuring packet. The packet process time measuring unit 108 measures the packet process time Tp (image process time) required for processing a packet based on the packet sending time set in the process time measuring packet and the reception time of the process time measuring packet.

The packet process time measuring unit 108 outputs the packet process time Tp to the process time prediction unit 102. In step S206, the process time prediction unit 102 determines a timestamp. The timestamp is set in the Arrival Time 505 of the header information.

In step S207, the tile division unit 104 starts dividing the received video data into tiles. In step S208, the packet generation unit 101 generates a video tile packet and sends it. In step S209, tile division and packet generation are repeated until the end of video input (image data input).

As described above, according to this embodiment, a process time measuring packet is sent to measure the packet process time. The video data process time is predicted based on the measurement result, and the time of arrival at the packet reception unit is added to the header information.

This allows accurately predicting the video data process time and eliminate disorder in an image caused by delay of packet arrival. It is also possible to decrease the amount of packets that arrive early and thus reduce the necessary buffer area capacity.

Second Embodiment

Figure 3:
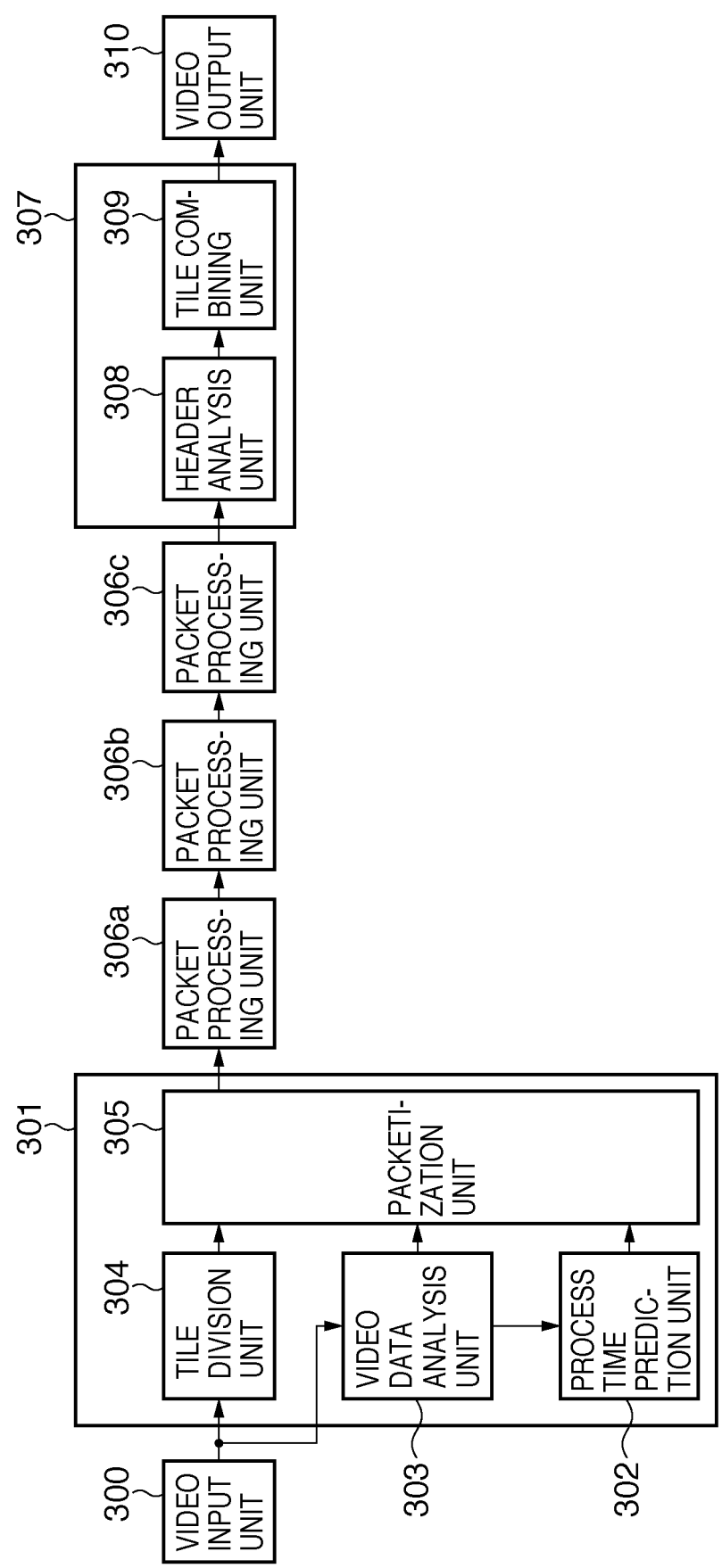
FIG. 3 is a block diagram showing the arrangement of a moving image processing system according to the second embodiment of the present invention.

FIG. 3 is a block diagram showing the arrangement of a moving image processing system according to the second embodiment of the present invention. Referring to FIG. 3, a video input unit 300 is connected to a tile division unit 304 and a video data analysis unit 303 in a packet generation unit 301. The packet generation unit 301 receives an input from the video input unit 300 and generates packets. The packet generation unit 301 includes the tile division unit 304, the video data analysis unit 303, a process time prediction unit 302, and a packetization unit 305. The tile division unit 304 is connected to the packetization unit 305, and is the same as the tile division unit 104 described in the first embodiment.

The video data analysis unit 303 is connected to the video input unit 300 and the process time prediction unit 302. The video data analysis unit 303 analyzes an input moving image (video data) and extracts feature information of the moving image (the resolution, motion vector, and compression ratio of the video data).

The process time prediction unit 302 is connected to the packetization unit 305 and the video data analysis unit 303.

The process time prediction unit 302 predicts a packet process time based on the resolution, motion vector, and compression ratio of the video data extracted by the video data analysis unit 303. The process time prediction unit 302 predicts a packet process time Tp based on a reference packet process time Tbase, a coefficient K by the resolution, a coefficient V by the motion vector, and a coefficient D by the compression ratio in accordance with $$Tp(\text{packet process time}) = Tbase \times K \times V \times D \quad (4)$$

Then, the process time prediction unit 302 adds the packet process time Tp, a maximum permissible error time Tm including a fluctuation of time necessary for packet processing, and a packet sending time Tsend, thereby determining a timestamp Ts in accordance with $$Ts(\text{timestamp}) = Tp + Tm + Tsend \quad (5)$$

The reference packet process time Tbase, the coefficient K by the resolution, the coefficient V by the motion vector, and the coefficient D by the compression ratio are stored in table data in the process time prediction unit 302.

The packetization unit 305 receives inputs from the tile division unit 304 and the process time prediction unit 302 and sends the packet to a packet processing unit 306. The packetization unit 305 adds a packet header, generates a command packet, and sends the packet to a packet processing unit 306a. The packet processing units 306a, 306b, and 306c are the same as the packet processing units 106a, 106b, and 106c of the first embodiment.

The packet reception unit 307 includes a header analysis unit 308 and a tile combining unit 309. The packet reception unit 307 receives an input from the packet processing unit 306c and outputs video data to a video output unit 310. The header analysis unit 308 receives a packet from the packet processing unit 306c and analyzes header information. If the received packet is a command packet, the header analysis unit 308 discards the packet without any processing. Upon receiving a video tile packet, the header analysis unit 308 separates header information and video tile data and outputs the video tile data to the tile combining unit 309.

The tile combining unit 309 is the same as the tile combining unit 110 of the first embodiment. The video output unit 310 is the same as the video output unit 111 of the first embodiment. The packet format of the second embodiment is the same as in the first embodiment. In the second embodiment, there are two kinds of packets, command packet and video tile packet.

Figure 4:
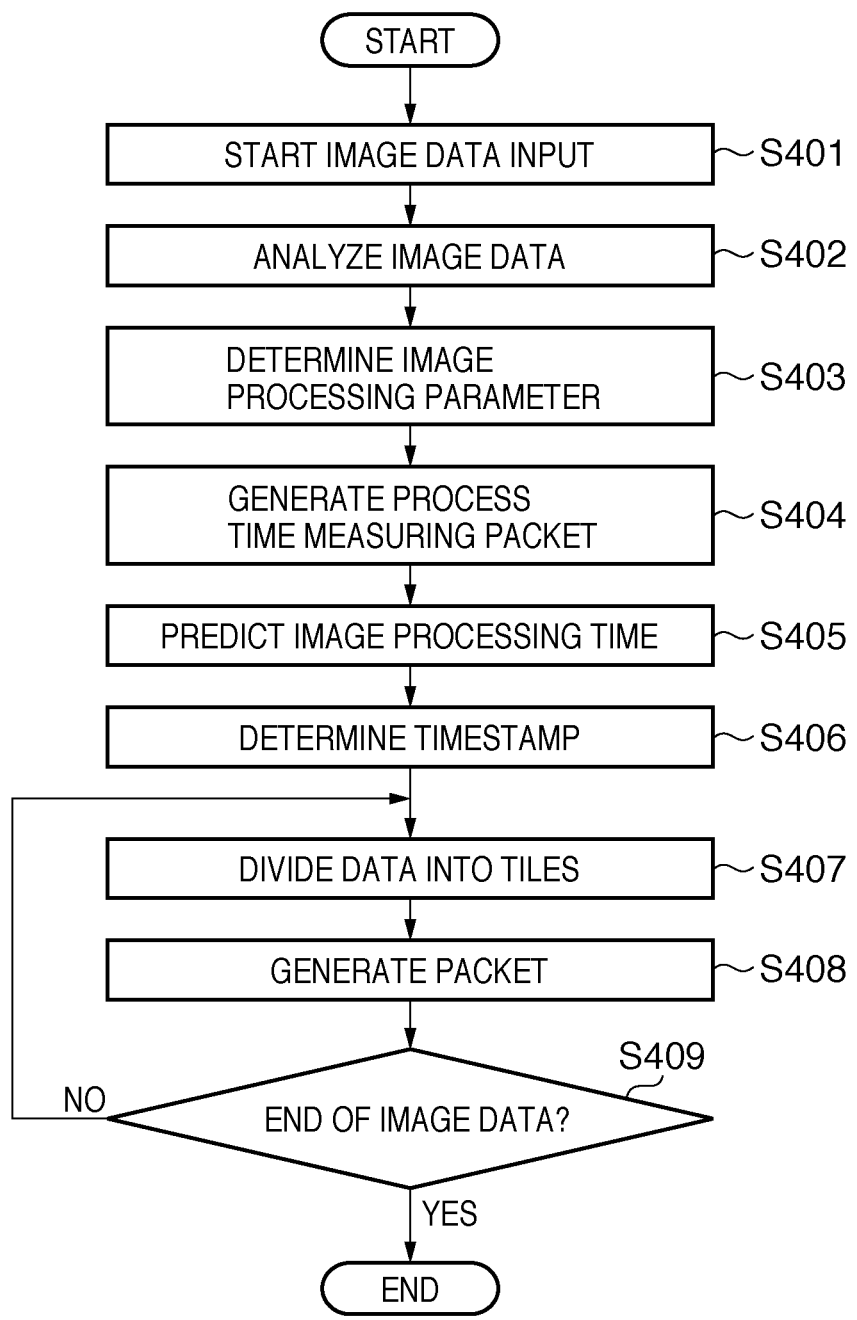
FIG. 4 is a flowchart for explaining the operation of the moving image processing system according to the second embodiment of the present invention.

The operation of the moving image processing system according to the second embodiment of the present invention will be described next with reference to FIG. 4. In step S401, the video input unit 300 starts inputting video data. In step S402, the video data analysis unit 303 analyzes the received video data (image data). In step S403, the packet generation unit 301 determines the process path. In this embodiment, since a packet is sent in a single direction and never returns from the sending destination, the process path is uniquely determined. When the process path is determined, a next input port & parameter index 501 in the header information is determined.

In step S404, the packet generation unit 301 determines image process parameters in the packet processing units 306a, 306b, and 306c. The packet generation unit 301 generates command packets to the packet processing units 306a, 306b, and 306c in accordance with the determined image process parameter values, and sends the command packets.

In step S405, the video data analysis unit 303 analyzes the input video data and extracts the resolution, compression ratio, and motion vector of the video data. In step S406, the process time prediction unit 302 determines a timestamp. The timestamp is set in an Arrival Time 505 of the header information.

In step S407, the tile division unit 304 starts dividing the video data into tiles. In step S408, the packet generation unit 301 generates a video tile packet and sends it. In step S409, tile division and packet generation are repeated until the end of video input (image data input).

As described above, according to this embodiment, input video data is analyzed. The video data process time is predicted based on the features of the video data, and the time of arrival at the packet reception unit is added to the header information. This allows a simple arrangement to predict the process time and eliminate disorder in an image caused by delay of packet arrival. It is also possible to decrease the amount of packets that arrive early and thus reduce the necessary buffer area capacity.

Third Embodiment

Figure 8:
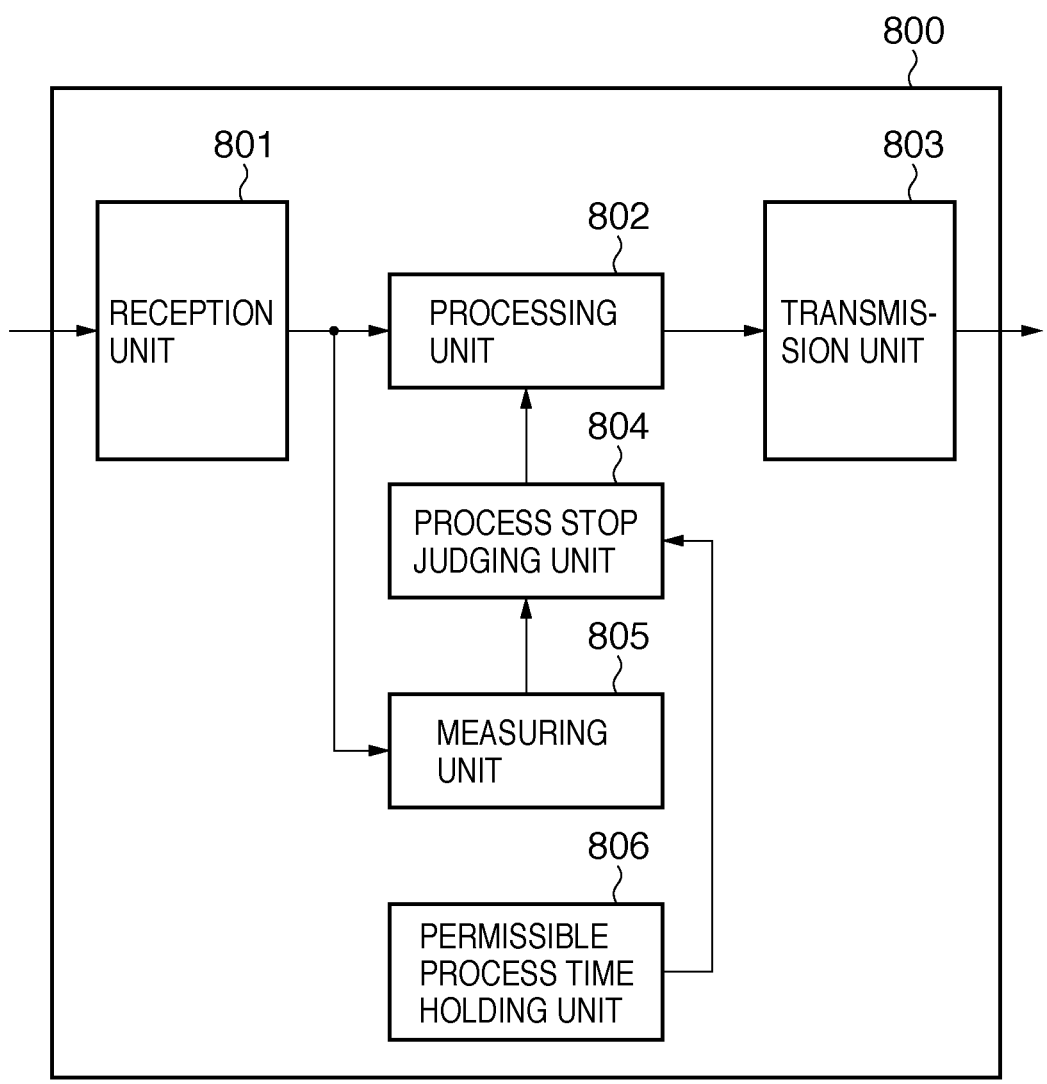
FIG. 8 is a block diagram showing an example of the functional arrangement of an information processing apparatus 800 according to the third embodiment of the present invention.

The arrangement of an information processing apparatus 800 according to the third embodiment will be described with reference to FIGS. 8 and 9. FIG. 8 is a block diagram showing an example of the functional arrangement of the information processing apparatus 800 according to this embodiment.

The information processing apparatus 800 includes a reception unit 801, processing unit 802, transmission unit 803, process stop judging unit 804, measuring unit 805, and permissible process time holding unit 806. All or some of the elements can be implemented by hardware such as circuits or software.

The reception unit 801 receives a packet obtained by dividing video data from another apparatus. The other apparatus can be either another information processing apparatus 800 or a video transmission apparatus 1010 to be described later. The reception unit 801 outputs the received packet to the processing unit 802 and simultaneously notifies the measuring unit 805 of the packet reception.

The processing unit 802 executes predetermined processing for the received packet. The processing executed here includes, for example, resolution enhancement conversion, error correction, sharpness conversion, and progressive conversion to improve the image quality of video data. Not only processing of raising image quality but also processing of improving sound quality may be performed. The present invention is applicable if the processing has a plurality of modes at different process speeds. When the processing has ended, the processed packet is output to the transmission unit 803. The transmission unit 803 transmits the received processed packet to another apparatus. The other apparatus can be either another information processing apparatus 800 or a video reception apparatus 1030 to be described later.

The measuring unit 805 measures the elapsed time after notification reception from the reception unit 801. The elapsed time equals the time which has elapsed after the start of processing of the processing unit 802. In this embodiment, the time is measured based on the clock cycle of the information processing apparatus 800. However, any reference such as the real time is usable if it has a time counting function. The measuring unit 805 outputs the elapsed time to the process stop judging unit 804.

The permissible process time holding unit 806 holds a permissible process time which is a process time usable by the processing unit 802 for processing. The process stop judging unit 804 reads out the permissible process time from the permissible process time holding unit 806.

The process stop judging unit 804 compares the elapsed time received from the measuring unit 805 with the permissible process time received from the permissible process time holding unit 806. If the elapsed time exceeds the permissible process time, the process stop judging unit 804 instructs the processing unit 802 to stop processing. Upon receiving the instruction before the end of processing, the processing unit 802 stops packet processing. Even when the processing has stopped, the processing unit 802 outputs a packet to the transmission unit 803. The packet to be output from the processing unit 802 to the transmission unit 803 can be either a packet before the start of processing of the processing unit 802 or a packet at the time of process stop. Even when the packet processing has stopped, the transmission unit 803 transmits the packet received from the processing unit 802 to another apparatus.

Figure 9:
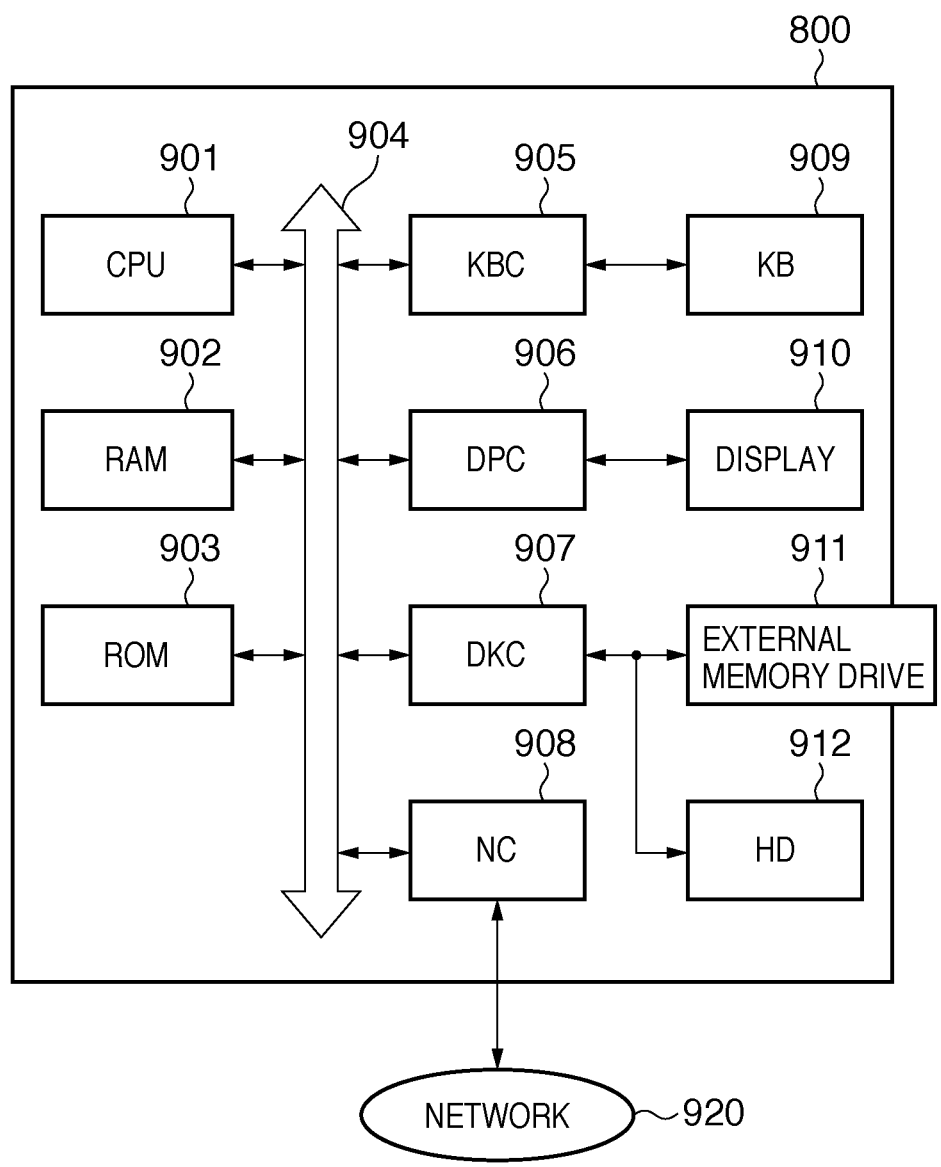
FIG. 9 is a block diagram showing an example of the hardware configuration of the information processing apparatus 800 according to the third embodiment of the present invention.

FIG. 9 is a block diagram showing an example of the hardware configuration of the information processing apparatus 800. FIG. 9 illustrates a minimum configuration to implement the arrangement of the information processing apparatus 800 corresponding to the embodiment of the present invention. Other mechanisms associated with the information processing apparatus 800 are not illustrated for the descriptive convenience.

A CPU 901 that is a microprocessor controls the information processing apparatus 800 based on programs and data stored in a ROM 903, a hard disk (HD) 912, and a storage medium set in an external memory drive 911.

A RAM 902 functions as the work area of the CPU 901 and holds programs stored in the ROM 903 and the HD 912. The RAM 902 also holds a packet under processing.

The ROM 903, the storage medium set in the external memory drive 911, or the HD 912 stores programs to be executed by the CPU 901, as shown in the flowcharts to be described later. The ROM 903 functions as the permissible process time holding unit 806 shown in FIG. 8.

A keyboard controller (KBC) 905 controls inputs from a keyboard (KB) 909 or a pointing device such as a mouse (not shown). A display controller (DPC) 906 controls display on a display 910. A disk controller (DKC) 907 controls access to the HD 912 and the external memory drive 911, and reads/writes various kinds of programs and various kinds of data such as font data, user files, and edit files from/in the storage media. A network controller (NC) 908 communicates with a network 920. The network controller 908 functions as the reception unit 801 and the transmission unit 803 in FIG. 8.

Note that the CPU 901 rasterizes an outline font on, for example, a display information area allocated on the RAM 902 or a dedicated video memory (VRAM) to enable display on the display 910. The CPU 901 also opens various kinds of registered windows and executes various kinds of data processing based on commands designated by, for example, a mouse cursor on the display 910.

Figure 10:
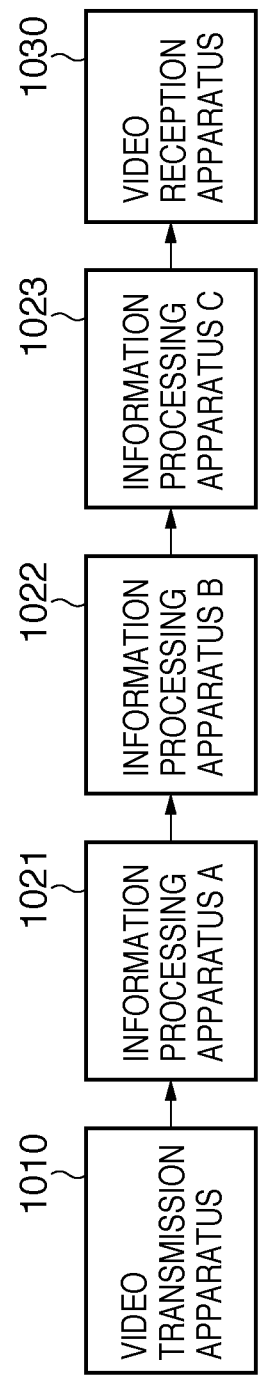
FIG. 10 is a view for explaining an example of a video processing system according to the third embodiment of the present invention.

An information processing system using the information processing apparatus 800 according to this embodiment will be described with reference to FIG. 10. FIG. 9 shows an example of the information processing system according to this embodiment. The information processing system includes the video transmission apparatus 1010, an information processing apparatus A 1021, an information processing apparatus B 1022, an information processing apparatus C 1023, and the video reception apparatus 1030. The example shown in FIG. 10 includes three information processing apparatuses. However, the number of information processing apparatuses is not limited as long as at least one information processing apparatus exists. The information processing apparatuses can be arranged in series as shown in FIG. 10. Alternatively, some or all of them may be arranged in parallel.

The video transmission apparatus 1010 divides video data into packets and transmits them to the information processing apparatus A 1021. Each information processing apparatus receives the packet and performs processing in accordance with a flowchart to be described later. The video reception apparatus 1030 decompress the video data from the received packets and displays the video data.

Figure 11:
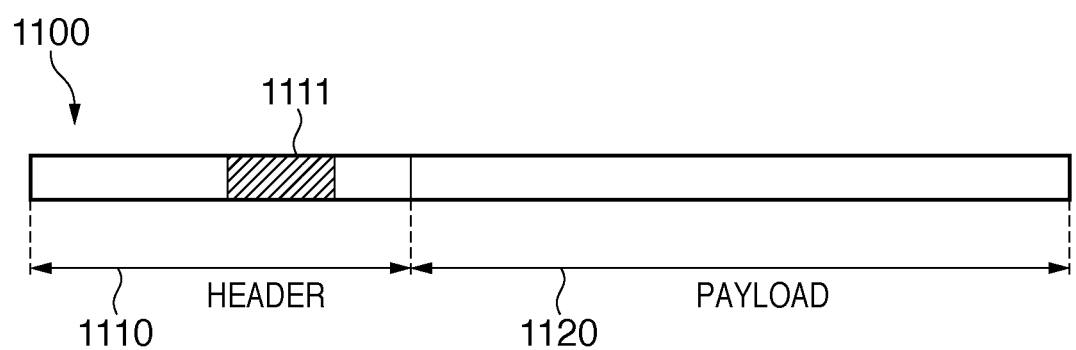
FIG. 11 is a view for explaining an example of the structure of a packet according to the third embodiment of the present invention.

The structure of a packet 1100 will be described with reference to FIG. 11. FIG. 11 is a view for explaining an example of the structure of the packet 1100 according to this embodiment. The packet includes a header 1110 and a payload 1120. The header 1110 includes information necessary for packet communication and video data decompression. The header 1110 also includes a timestamp 1111. The timestamp 1111 represents a time at which video data decompressed from the packets received by the video reception apparatus 1030 should be displayed. The payload 1120 includes divided video data.

Referring back to FIG. 10, the description of the video processing system will be continued. This embodiment treats an example in which a time 12 cycles after the packet transmission time of the video transmission apparatus 1010 is designated as the timestamp 1111. The embodiment also treats an example in which the permissible process times of the information processing apparatus A 1021, information processing apparatus B 1022, and information processing apparatus C 1023 are set to three cycles, four cycles, and five cycles, respectively. The permissible process times may be preset in the ROM 903 or individually designated by the video transmission apparatus 1010 in accordance with the setting of the timestamp 1111. Each information processing apparatus never holds a packet beyond the permissible process time. For this reason, the video reception apparatus 1030 receives the packet 1100 within 12 cycles after the video transmission apparatus 1010 has transmitted the packet 1100. That is, the permissible process times of the information processing apparatuses are set such that the sum of the permissible process times does not exceed the time from transmission of the packet 1100 by the video transmission apparatus 1010 to the time designated by the timestamp 1111. In this embodiment, the overhead of the network is not taken into consideration for the sake of simplicity. However, the permissible process times may be defined in consideration of the overhead of the network.

The operation of the information processing apparatus 800 will be described next with reference to FIG. 12. FIG. 12 is a flowchart for explaining an example of the operation of the information processing apparatus 800 according to this embodiment. The flowchart is processed by causing the CPU 901 to execute a computer program written in the ROM 903.

In step S1201, the reception unit 801 receives the packet 1100. The reception unit 801 outputs the received packet 1100 to the processing unit 802 and notifies the measuring unit 805 of the output. For example, the information processing apparatus A 1021 receives the packet 1100 from the video transmission apparatus 1010.

In step S1202, the processing unit 802 starts predetermined processing for the received packet 1100.

In step S1203, the measuring unit 805 which has received the notification from the reception unit 801 starts measuring the elapsed time. Every time the elapsed time increases, the measuring unit 805 outputs the elapsed time to the process stop judging unit 804.

In step S1204, the process stop judging unit 804 compares the elapsed time received from the measuring unit 805 with the permissible process time held by the permissible process time holding unit 806. If the elapsed time is longer than the permissible process time ("YES" in step S1204), the process advances to step S1206. If the elapsed time is not longer than the permissible process time ("NO" in step S1204), the process advances to step S1205.

In step S1205, the processing unit 802 judges whether the processing of the packet 1100 has ended. If the processing has ended ("YES" in step S1205), the processing unit 802 outputs the processed packet 1100 to the transmission unit 803, and the process advances to step S1207. If the processing has not ended ("NO" in step S1205), the process returns to step S1204.

In step S1206, even when the processing has not ended yet, the processing unit 802 stops the processing and outputs the packet 1100 to the transmission unit 803. The packet 1100 to be output here can be either the packet received by the reception unit 801 or the packet 1100 at the time of process stop. The processing unit 802 determines the packet 1100 to be output based on the contents of the processing.

In step S1207, the transmission unit 803 transmits the packet 1100 received from the processing unit 802 to the succeeding apparatus. For example, the information processing apparatus A 1021 transmits the packet 1100 to the information processing apparatus B 1022.

An example of the operation of the video processing system based on the above-described flowchart will be described. Assume that the information processing apparatus A 1021 requires two cycles for processing. In this case, the process time is shorter than the permissible process time, that is, three cycles. Hence, the information processing apparatus A 1021 ends whole processing and transmits the packet 1100 to the information processing apparatus B 1022. The time from reception of the packet 1100 to transmission by the information processing apparatus A 1021 is two cycles.

Assume that the information processing apparatus B 1022 requires six cycles for processing. In this case, the process time is longer than the permissible process time, that is, four cycles. Hence, the information processing apparatus B 1022 stops the processing halfway and transmits the packet 1100 to the information processing apparatus C 1023. The time from reception of the packet 1100 to transmission by the information processing apparatus B 1022 is four cycles.

Finally, assume that the information processing apparatus C 1023 requires five cycles for processing. In this case, the process time is equal to the permissible process time, that is, five cycles. Hence, the information processing apparatus C 1023 ends whole processing and transmits the packet 1100 to the video reception apparatus 1030. The time from reception of the packet 1100 to transmission by the information processing apparatus C 1023 is five cycles.

In the above example, if a packet is processed without applying the present invention, 13 cycles are taken from transmission of the packet 1100 by the video transmission apparatus 1010 to reception of the packet 1100 by the video reception apparatus 1030. However, application of the present invention makes the time 11 cycles so that the packet 1100 arrives at the video reception apparatus 1030 before the time designated in the timestamp 1111 by the video transmission apparatus 1010.

As described above, according to this embodiment, even when the processing performance of the information processing apparatus 800 deteriorates, the video reception apparatus 1030 can display video data at the time designated by the video transmission apparatus 1010 so that disorder in the image can be reduced.

Fourth Embodiment

Figure 13:
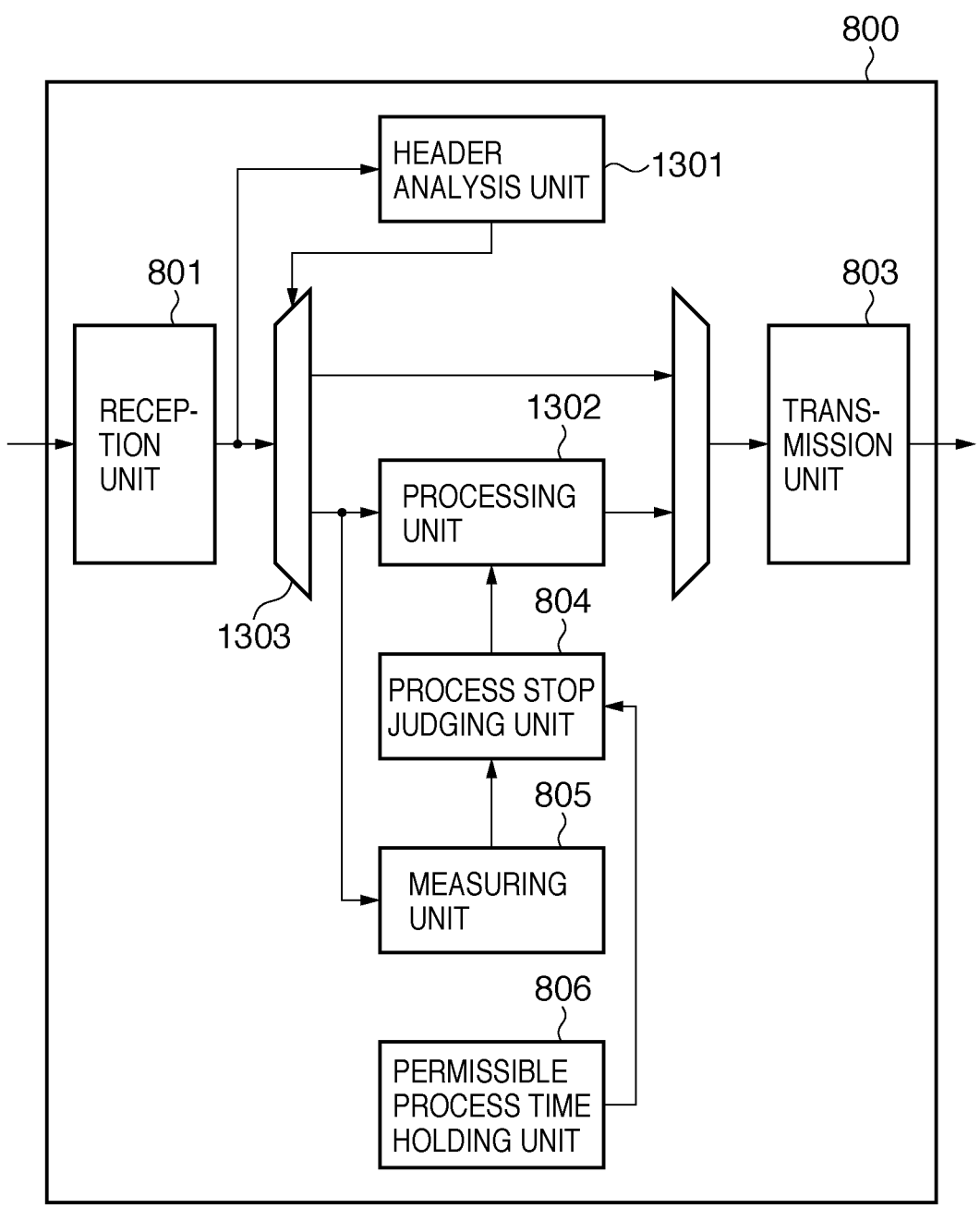
FIG. 13 is a block diagram showing an example of the functional arrangement of an information processing apparatus 800 according to the fourth embodiment of the present invention.

The arrangement of an information processing apparatus 800 according to the fourth embodiment will be described. FIG. 13 is a block diagram showing an example of the functional arrangement of the information processing apparatus 800 according to this embodiment. The same reference numerals as in FIG. 8 of the third embodiment denote the same elements in the fourth embodiment, and a description thereof will not be repeated.

The information processing apparatus 800 further includes a header analysis unit 1301 and a switching unit 1303. All or some of the elements can be implemented by hardware such as circuits or software.

The header analysis unit 1301 analyzes a header 1110 of a packet 1100 received from a reception unit 801, and judges whether to cause a processing unit 1302 to process the packet 1100. Upon judging to process the packet 1100, the switching unit 1303 is connected to input the packet 1100 to the processing unit 1302. Upon judging not to process the packet 1100, the switching unit 1303 is connected not to input the packet 1100 to the processing unit 1302.

When processing is interrupted, the processing unit 1302 changes a process flag 1401 included in the header 1110 of the packet 1100 to "invalid".

Figure 14:
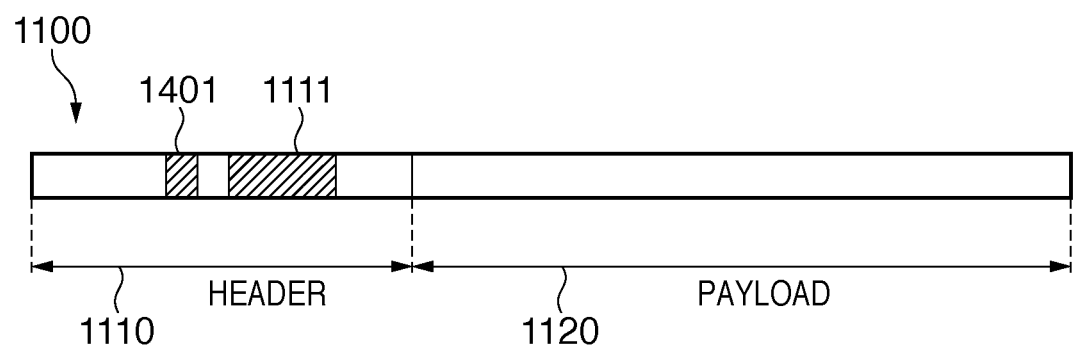
FIG. 14 is a view for explaining an example of the structure of a packet according to the fourth embodiment of the present invention.

The structure of the packet 1100 according to this embodiment will be described with reference to FIG. 14. FIG. 14 is a view for explaining an example of the structure of the packet 1100 according to this embodiment. The same reference numerals as in FIG. 11 of the third embodiment denote the same elements, and a description thereof will not be repeated.

The header 1110 further includes the process flag 1401. One of "valid" and "invalid" is set in the process flag 1401. If "valid", the information processing apparatus 800 executes processing of the packet 1100. If "invalid", the information processing apparatus 800 does not execute processing of the packet 1100.

The block diagram of the hardware configuration of the information processing apparatus 800 according to this embodiment is the same as that described in the third embodiment with reference to FIG. 9, and a description thereof will not be repeated. The information processing system is also the same as that described in the third embodiment with reference to FIG. 10, and a description thereof will not be repeated.

Figure 15:
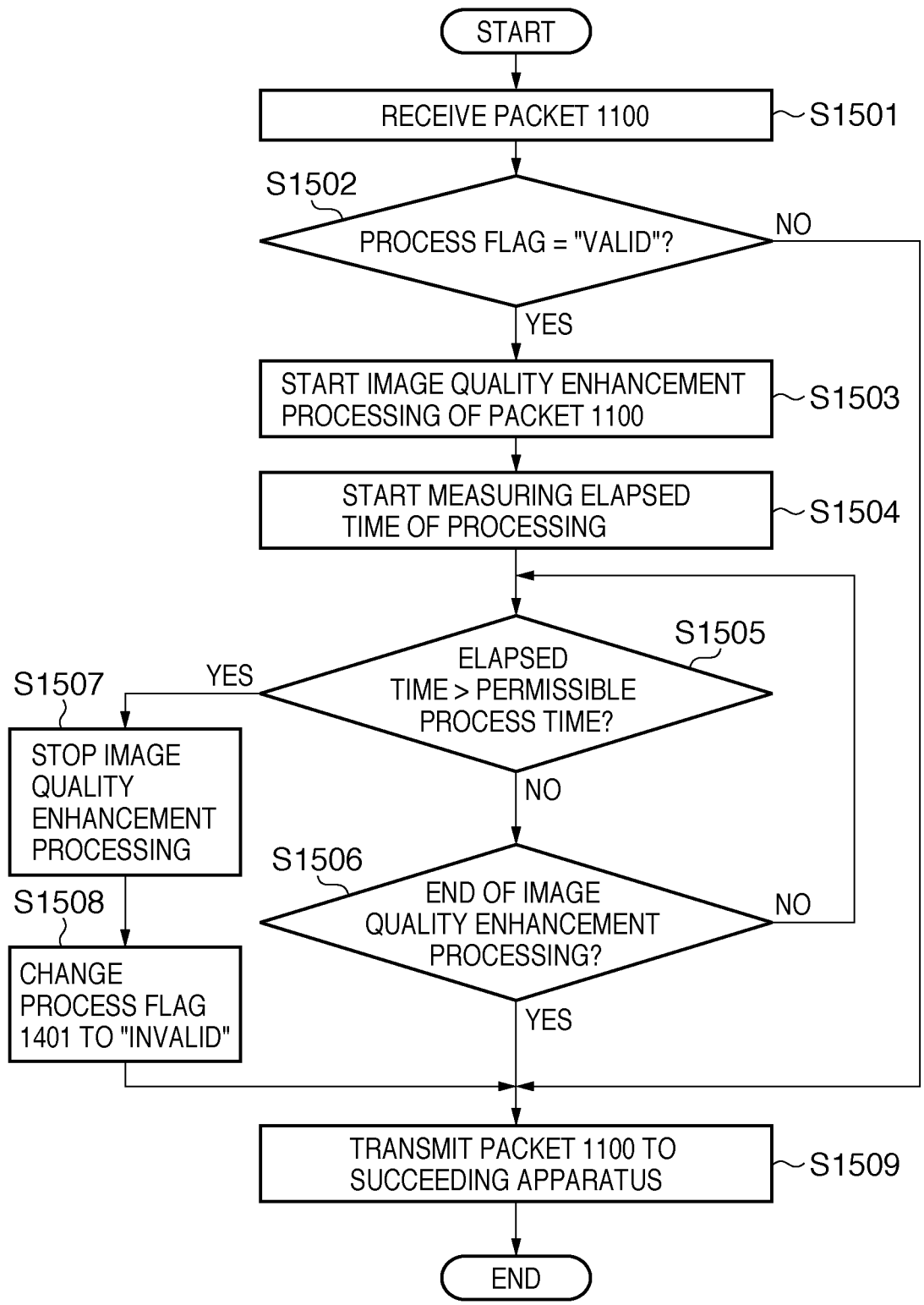
FIG. 15 is a flowchart for explaining an example of the operation of the information processing apparatus 800 according to the fourth embodiment of the present invention.

The operation of the information processing apparatus 800 will be described next with reference to FIG. 15. FIG. 15 is a flowchart for explaining an example of the operation of the information processing apparatus 800 according to this embodiment. The flowchart is processed by causing a CPU 901 to execute a computer program written in a ROM 903.

In step S1501, the information processing apparatus 800 receives the packet 1100 from another apparatus. The received packet 1100 is output to the header analysis unit 1301 and the switching unit 1303.

In step S1502, the header analysis unit 1301 analyzes the process flag included in the header 1110 of the received packet 1100. If the process flag 1401 is "valid" ("YES" in step S1502), the process advances to step S1503. If the process flag 1401 is "invalid" ("NO" in step S1502), the process advances to step S1509. In this case, a transmission unit 803 transmits the packet 1100 to the succeeding apparatus without executing any processing of the packet 1100.

Steps S1502 to S1507 are the same as steps S1202 to S1206 shown in FIG. 12 described in the third embodiment, and a description thereof will not be repeated.

In step S1508, the processing unit 1302 changes the process flag 1401 included in the header 1110 to "invalid". This prohibits the succeeding information processing apparatus 800 from processing the packet 1100.

Step S1509 is the same as in step S1207 shown in FIG. 12 described in the third embodiment, and a description thereof will not be repeated.

An example of the operation of the video processing system will be described with reference to FIG. 10. This embodiment also treats an example in which a time 12 cycles after the packet transmission time of a video transmission apparatus 1010 is designated as a timestamp 1111, like the first embodiment. The embodiment also treats an example in which the permissible process times of an information processing apparatus A 1021, information processing apparatus B 1022, and information processing apparatus C 1023 are set to three cycles, four cycles, and five cycles, respectively.

First, the video transmission apparatus 1010 sets "valid" in the process flag 1401 and transmits the packet to the information processing apparatus A 1021.

Assume that the information processing apparatus A 1021 requires two cycles for processing. In this case, the process time is shorter than the permissible process time, that is, three cycles. Hence, the information processing apparatus A 1021 ends whole processing and transmits the packet 1100 to the information processing apparatus B 1022. The time from reception of the packet 1100 to transmission by the information processing apparatus A 1021 is two cycles. The process flag 1401 remains "valid".

Assume that the information processing apparatus B 1022 requires six cycles for processing. In this case, the process time is longer than the permissible process time, that is, four cycles. Hence, the information processing apparatus B 1022 stops the processing halfway and transmits the packet 1100 to the information processing apparatus C 1023. At this time, the process flag 1401 changes to "invalid". The time from reception of the packet 1100 to transmission by the information processing apparatus B 1022 is four cycles.

Finally, assume that the information processing apparatus C 1023 requires five cycles for processing. However, since the process flag 1401 is "invalid", the information processing apparatus C 1023 transmits the video transmission apparatus 1010 to a video reception apparatus 1030 without executing any processing. The time from reception of the packet 1100 to transmission by the information processing apparatus C 1023 is zero cycle.

In the above example, if a packet is processed without applying the present invention, 13 cycles are taken from transmission of the packet 1100 by the video transmission apparatus 1010 to reception of the packet 1100 by the video reception apparatus 1030. However, application of the present invention makes the time six cycles so that the packet 1100 arrives at the video reception apparatus 1030 before the time designated in the timestamp 1111 by the video transmission apparatus 1010.

As described above, according to this embodiment, even when the processing performance of the information processing apparatus 800 deteriorates, the video reception apparatus 1030 can display video data at the time designated by the video transmission apparatus 1010 so that disorder in the image can be reduced.

In this embodiment, processes in all succeeding information processing apparatuses 800 are equally invalidated. However, processes in some information processing apparatuses 800 may be invalidated. For example, each information processing apparatus 800 whose permissible process time is equal to or more than a predetermined threshold may be invalidated. Alternatively, priority may be set for each information processing apparatus 800, and each information processing apparatus 800 whose priority is equal to or less than a predetermined threshold may be invalidated.

Fifth Embodiment

Figure 16:
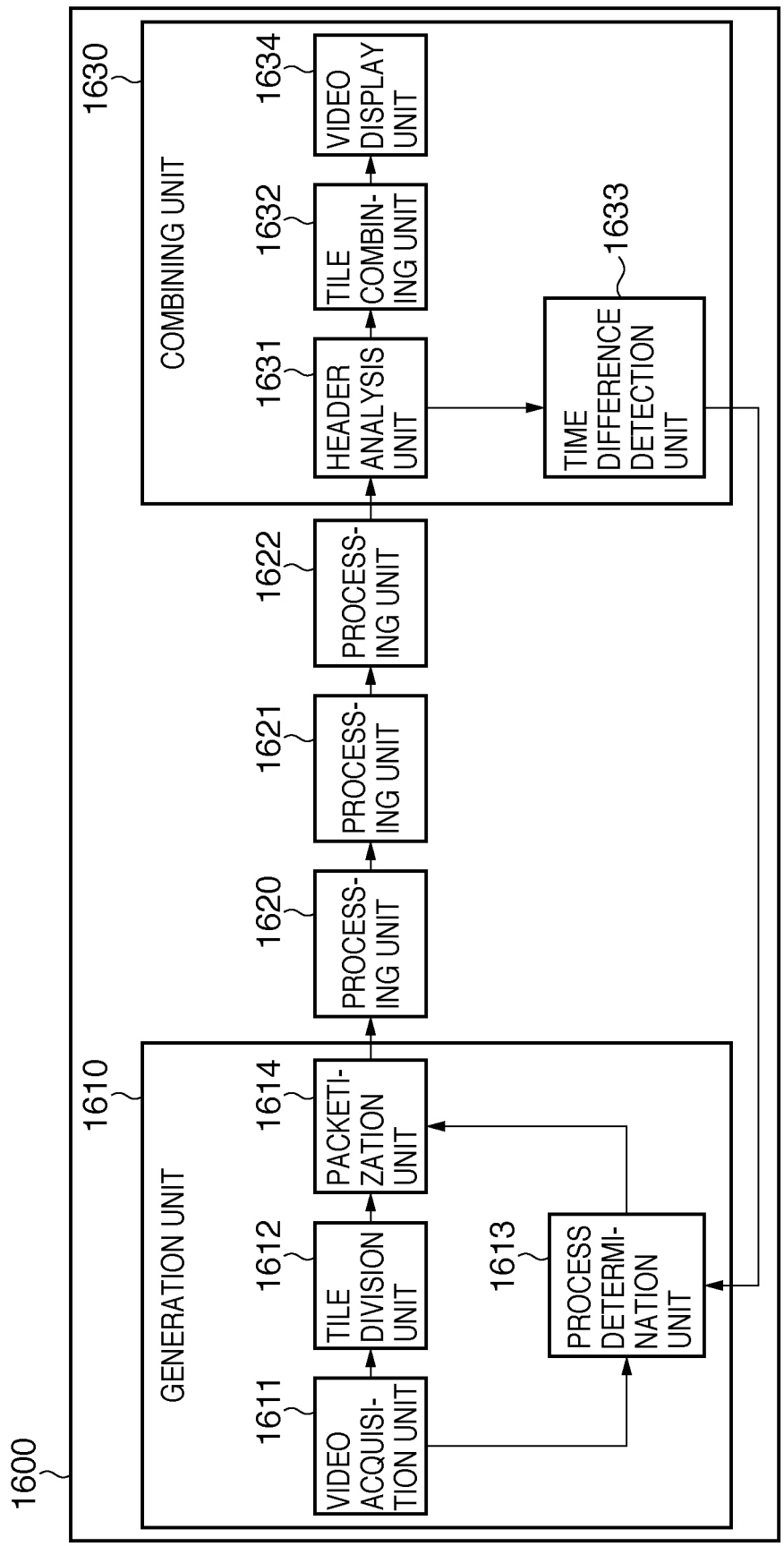
FIG. 16 is a block diagram for explaining an example of the functional arrangement of an information processing apparatus 1600 according to the fifth embodiment of the present invention.

An information processing apparatus 1600 according to the present invention will be described with reference to FIG. 16. FIG. 16 is a block diagram for explaining an example of the functional arrangement of the information processing apparatus 1600 according to this embodiment. The information processing apparatus 1600 includes a generation unit 1610, processing units 1620 to 1622, and combining unit 1630. In this embodiment, the apparatus includes the three processing units 1620 to 1622. However, the number of processing units is not particularly limited as far as at least one processing unit is included. The generation unit 1610, processing units 1620 to 1622, and combining unit 1630 may be formed as single devices.

The generation unit 1610 includes a video acquisition unit 1611, tile division unit 1612, process determination unit 1613, and packetization unit 1614. The generation unit 1610 divides data containing video and audio signals into packets and transmits them to the processing unit 1620. A case in which the data is video data will mainly be described below. Even when the data is audio data, the present invention is applicable similarly. The video acquisition unit 1611 acquires video data.

The video data may be acquired via a network or from a recording medium. Video data generated by another constituent element of the information processing apparatus 1600 may be acquired. The video acquisition unit 1611 outputs the acquired video data to the tile division unit 1612 and the process determination unit 1613.

The tile division unit 1612 divides each frame of the received video data into video tiles and outputs them to the packetization unit 1614. This embodiment treats an example in which each frame is divided into video tiles each including 8 pixels×128 pixels. However, the size is not limited to this. The process determination unit 1613 determines, based on the received video data, the path of processing units for processing the packet and the video data process mode of each processing unit. In this embodiment, assume that the packet is processed through the process path of the processing units 1620 to 1622. The process modes will be described later.

The packetization unit 1614 transmits the packet to the processing unit 1620 based on the inputs from the tile division unit 1612 and the process determination unit 1613. The packet to be transmitted is either a command packet to transmit a command to the processing units 1620 to 1622 or a video tile packet to transmit a video tile. Details of the packet will be described later. The packet includes, as a timestamp, a time at which a video display unit 1634 included in the combining unit 1630 should display the frame including the video tile. Note that "time" in this embodiment indicates not only the real time but also, for example, the clock cycle of the information processing apparatus 1600 having a time counting function.

The processing unit 1620 performs predetermined processing for the received packet. The processing executed here includes, for example, resolution enhancement conversion, error correction, sharpness conversion, and progressive conversion to improve the image quality of video data. For audio data, error correction, SBR (Spectral Band Replication), and the like are performed. The present invention is applicable not only to these processes of raising quality but also to any process having a plurality of modes at different process speeds. In this embodiment, image quality enhancement processing will be explained as a typical example. The processing unit 1620 has a plurality of modes of increasing the image quality of a packet. A mode to obtain higher-quality video data requires a longer process time. This embodiment treats an example in which the processing unit has two kinds of modes, "high image quality" and "high speed". However, the number of modes is not necessarily two. Assume that the "high image quality" mode needs a process time longer than that of the "high speed" mode. The processing unit 1620 can also transfer the packet directly without performing image quality enhancement processing. Needless to say, direct packet transfer shortens the time from packet reception to transmission by the processing unit 1620 as compared to image quality enhancement processing. The processing units 1621 and 1622 are the same as the processing unit 1620, and a description thereof will be omitted. The following description about the processing unit 1620 also applies to the processing units 1621 and 1622 unless otherwise specified. The processing unit which has ended the image quality enhancement processing transmits the packet to the next processing unit or the combining unit 1630 in accordance with the path determined by the process determination unit 1613.

The combining unit 1630 includes a header analysis unit 1631, tile combining unit 1632, time difference detection unit 1633, and the video display unit 1634, and reconstructs and displays a frame by combining received packets. The header analysis unit 1631 analyzes the header of the packet received from the processing unit 1622. Upon finding by header analysis that the received packet is a command packet, the header analysis unit 1631 discards it without processing. If the packet is a video tile packet, the header analysis unit 1631 separates it into a header and a video tile. The video tile is output to the tile combining unit 1632. The header is output to the time difference detection unit 1633. The tile combining unit 1632 combines received video tiles to reconstruct a frame and outputs it to the video display unit 1634. The video display unit 1634 displays the received frame in accordance with the designated timestamp. The time difference detection unit 1633 detects the difference between the time indicated by the timestamp designated by the packet and the time of actual packet reception by the combining unit 1630. If the difference falls outside a range defined in advance, the time difference detection unit 1633 notifies the process determination unit 1613 that the difference falls outside the range. The detected time difference may also be transmitted together with the notification.

Figure 17:
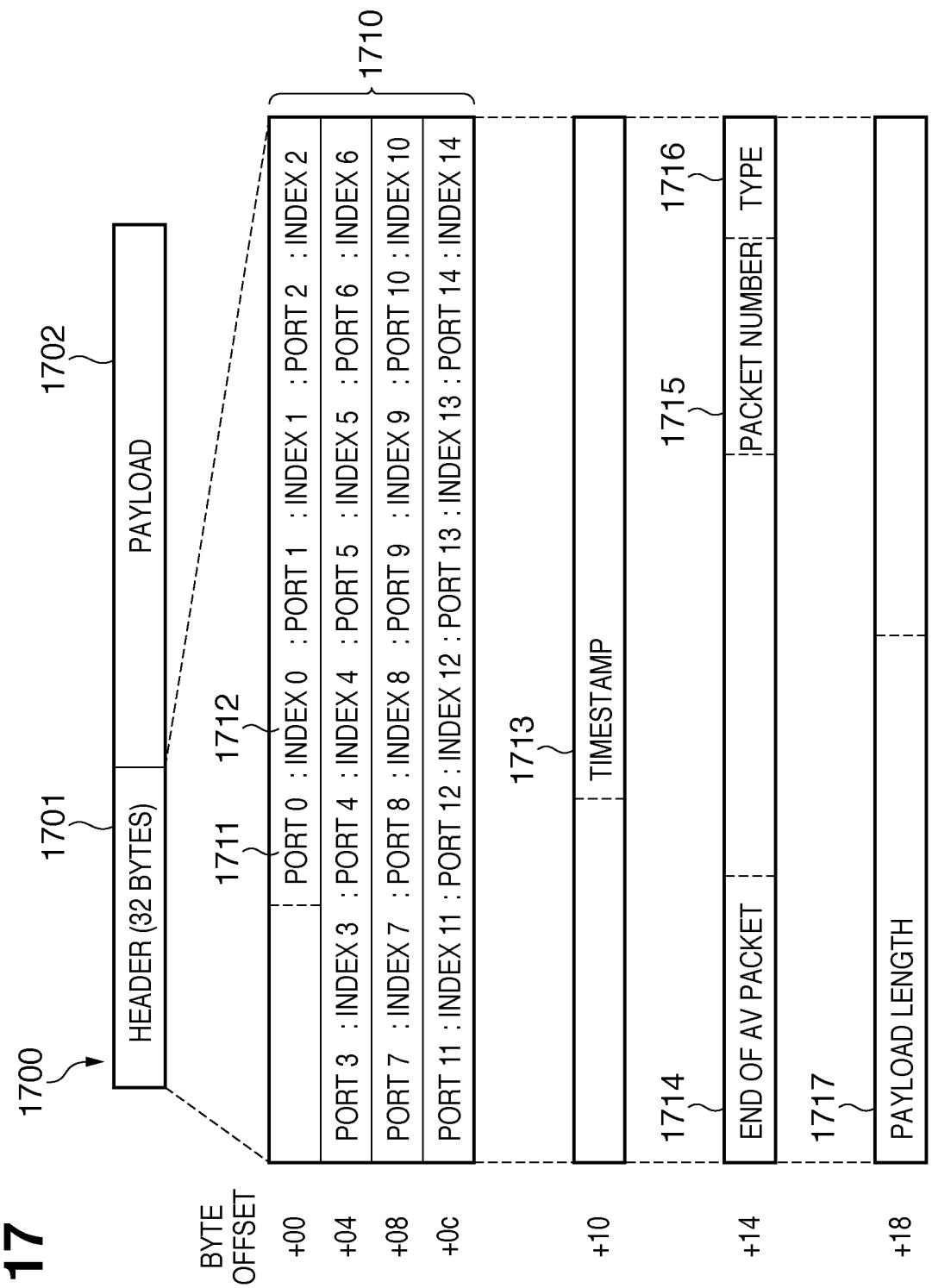
FIG. 17 is a view for explaining an example of the structure of a header 1701 included in a packet 1700 according to the fifth embodiment of the present invention.

A packet format according to the embodiment will be described next with reference to FIGS. 17 to 19. As described above, the information processing apparatus 1600 according to the present invention transmits video tiles and commands using packets. A packet 1700 is either a command packet 1800 shown in FIG. 18 or a video tile packet 1900 shown in FIG. 19. Either packet includes a common header 1701 shown in FIG. 17.

The format of the header 1701 will be described first with reference to FIG. 17. FIG. 17 is a view for explaining an example of the structure of the header 1701 included in the packet 1700. The packet 1700 includes the header 1701 and a payload 1702.

A packet path 1710 represents a path through which the processing units 1620 to 1622 process the packet 1700. First, the packetization unit 1614 designates, in port 0 and index 0 of the packet path 1710, the set of the port and index of the processing unit which should process the packet 1700 first. A port 1711 indicates the input port number of a processing unit, which allows unique identification of a processing unit. An index 1712 indicates the number of a static parameter to be used by a processing unit. In this embodiment, the processing unit 1620 corresponds to the processing unit. Next, the packetization unit 1614 designates, in port 1 and index 1 of the packet path 1710, the set of the port and index of the processing unit which should process the packet 1700 next. In this embodiment, the processing unit 1621 corresponds to the processing unit. The same processing is performed for the remaining sets of ports and indices, and a description thereof will be omitted. In the above-described way, the packetization unit 1614 designates the sets of ports and indices from the left end in the order of processing units to execute processing. A processing unit which has received the packet processes the packet 1700 and then shifts the packet path 1710 by eight bits to the left. The set of the port and index of the processing unit to process the packet 1700 next moves to the top of the packet path 1710. Based on the set at the top, the processing unit transmits the packet 1700 to the processing unit which should process the packet 1700 next. Without designation of the set of the succeeding processing unit, the processing unit transmits the packet 1700 to the combining unit 1630. The packet path 1710 stores 15 sets of the ports 1711 and indices 1712.

A timestamp 1713 represents a time at which the video display unit 1634 starts displaying a frame including image tile data contained in the packet 1700. This field is significant when the packet 1700 is a video tile packet but insignificant for a command packet. An end of AV packet 1714 indicates that the video tile packet 1900 included in one frame ends with this packet. A packet number 1715 indicates the packet number in the frame. The tile combining unit 1632 decompresses the frame from video tiles based on the packet number 1715. The packet number 1715 is 0 in the first video tile of the frame and is incremented by one in each of subsequent tiles. A type 1716 indicates whether the packet 1700 is the command packet 1800 or the video tile packet 1900. A payload length 1717 represents the number of bytes of the payload.

Figure 18:
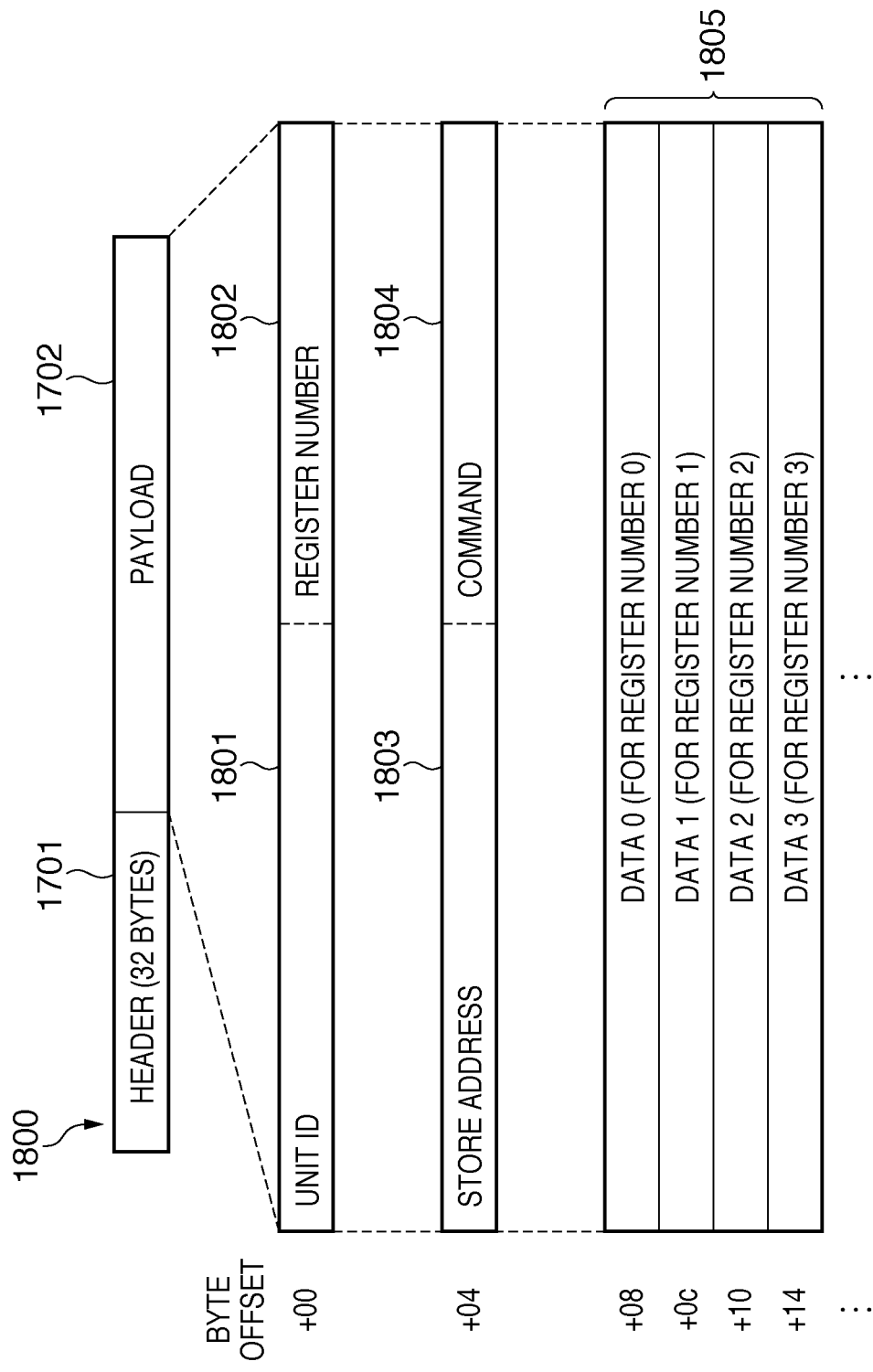
FIG. 18 is a view for explaining an example of the structure of a command packet 1800 according to the fifth embodiment of the present invention.

FIG. 18 is a view for explaining an example of the structure of the command packet 1800. Upon receiving the command packet 1800, each of the processing units 1620 to 1622 accesses a register in accordance with the description in the payload 1702. The command packet 1800 performs register access for each of the processing units 1620 to 1622 which processes the video tile packet 1900. A process mode is set by changing the register setting. Information included in the payload 1702 will be described below. A unit ID 1801 represents the ID of a target out of the processing units 1620 to 1622. Upon receiving the command packet 1800, each of the processing units 1620 to 1622 compares the unit ID 1801 with the ID of its own, thereby judging whether the command is targeted to the processing unit itself. A register number 1802 indicates the number of the register as a change target. A store address 1803 indicates the storage location of read data upon register read of the target processing unit. A command 1804 represents a command to the target out of the processing units 1620 to 1622. There are two kinds of commands 1804, write and read. A data field 1805 represents data to be used by the command 1804.

Figure 19:
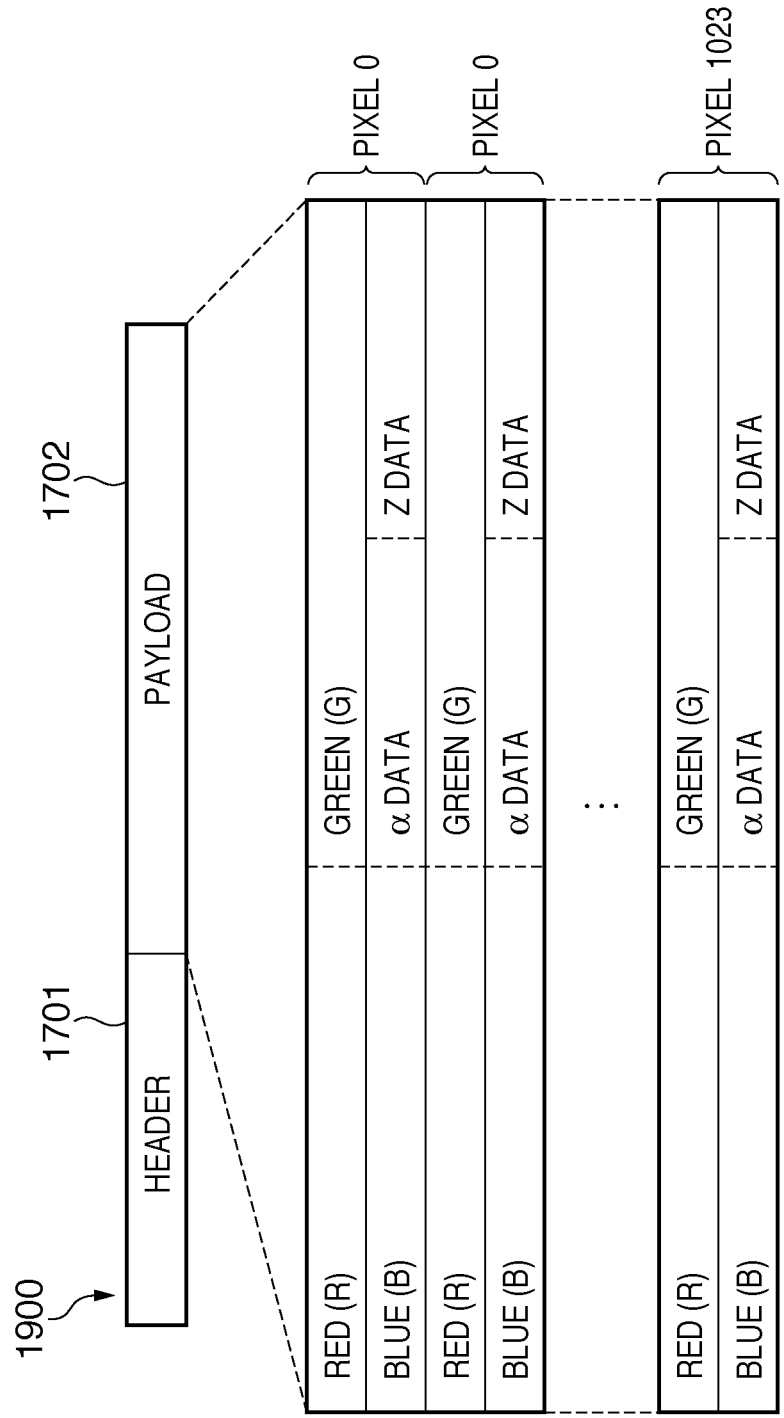
FIG. 19 is a view for explaining an example of the structure of a video tile packet 1900 according to the fifth embodiment of the present invention.

FIG. 19 is a view for explaining an example of the structure of the video tile packet 1900. Upon receiving the video tile packet 1900, the combining unit 1630 processes the video tile included in the payload 1702. The payload 1702 has a data amount of 8 Kbytes and stores 1,024 pixel data corresponding to a video tile having 8 pixels×128 pixels. The data amount of one pixel is 8 bytes. Each pixel data includes RGB data each expressed by 16 bits, 8-bit α data, and 8-bit Z data.

Figure 20:
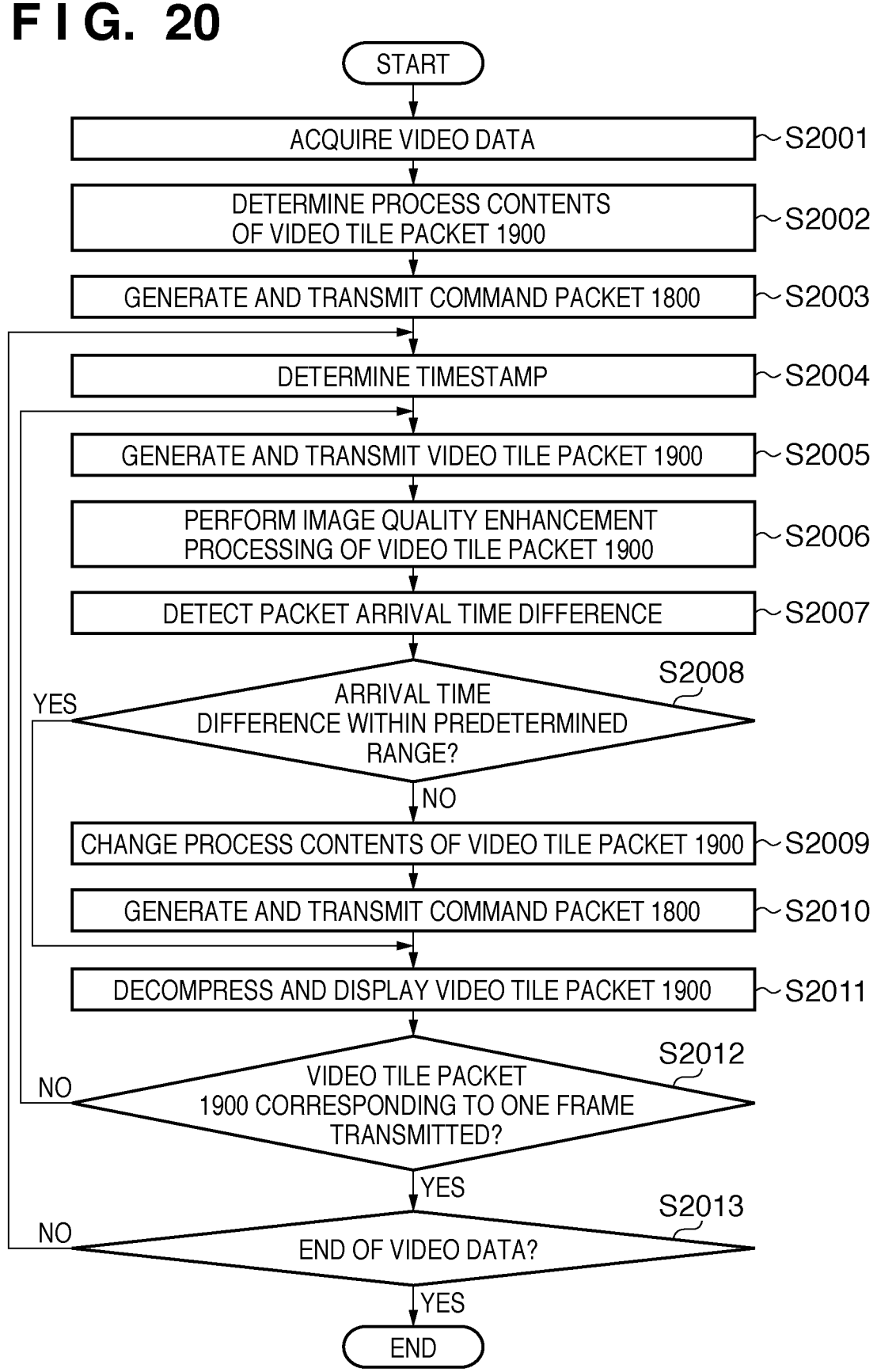
FIG. 20 is a flowchart for explaining an example of the operation of the information processing apparatus 1600 according to the fifth embodiment of the present invention.

The operation of the information processing apparatus 1600 according to this embodiment will be described next with reference to FIG. 20. FIG. 20 is a flowchart for explaining an example of the operation of the information processing apparatus 1600. The flowchart is processed by causing a CPU 901 to execute a computer program written in a ROM 903.

In step S2001, the video acquisition unit 1611 acquires video data and outputs it to the tile division unit 1612 and the process determination unit 1613.

In step S2002, the process determination unit 1613 determines the path of the processing units 1620 to 1622 to process a packet and the process mode of each processing unit, and outputs the contents to the packetization unit 1614. In this embodiment, the processing units 1620, 1621, and 1622 perform image quality enhancement processing for the packet in this order. In the initial state, the process mode is set to the "high speed" mode in all processing units.

In step S2003, the packetization unit 1614 creates the packet 1700 based on the received information and transmits it to the processing unit. The packetization unit 1614 generates the command packet 1800 to set each processing unit in accordance with the settings defined by the process determination unit 1613 and transmits it to each processing unit. The command packet 1800 has already been described with reference to FIG. 18, and a description thereof will not be repeated. The initial mode of each processing unit may be set in accordance with a default value upon activating the processing unit, instead of causing the command packet 1800 to set the mode, as described above.

In step S2004, the packetization unit 1614 determines the timestamp that is the time at which the video display unit 1634 displays the process target frame.

In step S2005, the packetization unit 1614 transmits, to the processing unit 1620, the video tile packet 1900 formed by adding the above-described timestamp to the video tile divided by the tile division unit 1612. Details of the video tile packet 1900 have already been described with reference to FIG. 19, and a description thereof will not be repeated.

In step S2006, each processing unit performs image quality enhancement processing for the received packet in the set mode and transmits the packet to the next processing unit or the combining unit 1630. Step S2006 is executed in all processing units on the path determined by the process determination unit 1613.

In step S2007, if the received packet is the video tile packet 1900, the header analysis unit 1631 outputs the header 1701 to the time difference detection unit 1633, and the payload 1702 to the tile combining unit 1632. The time difference detection unit 1633 calculates a value by subtracting the timestamp included in the header 1701 from the time of packet reception by the combining unit 1630.

In step S2008, the time difference detection unit 1633 judges whether the calculated value falls within a predetermined range. If the value falls within the range ("YES" in step S2008), the process advances to step S2011. If the value falls outside the range ("NO" in step S2008), the process advances to step S2009. A value falling within the range indicates that the calculated value is equal to or smaller than the upper limit value that is the first threshold and equal to or larger than the lower limit value that is the second threshold. The upper and lower limit values are defined in advance based on the time required by the tile combining unit 1632 for frame decompression or the size of the buffer to hold video tiles. The upper and lower limit values may dynamically be changed by the combining unit 1630 in accordance with the state of the information processing apparatus 1600. If the calculated difference is larger than the upper limit value (first case), the packet is supposed to have arrived at the combining unit 1630 before the defined time. On the other hand, if the calculated difference is smaller than the lower limit value (second case), the packet is supposed to have arrived at the combining unit 1630 after the defined time.

In step S2009, the time difference detection unit 1633 notifies the process determination unit 1613 that the calculated difference falls outside the defined range. The calculated difference may be transmitted together with the notification. The process determination unit 1613 changes the process contents and path of the processing units based on the received contents.

Figure 21:
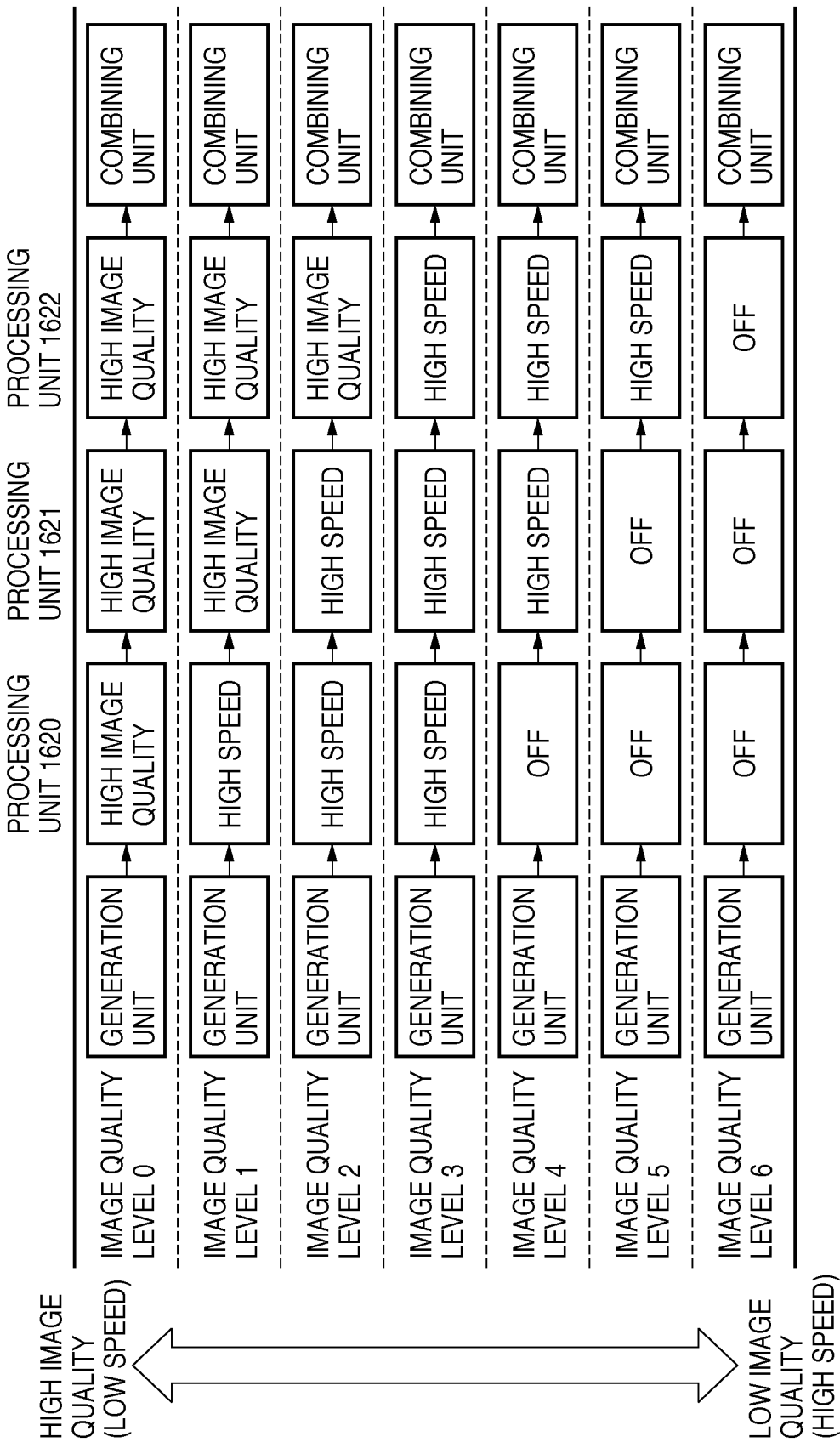
FIG. 21 is a view for explaining an example of process mode transition according to the fifth embodiment of the present invention.

Changing the process contents and path of the processing units will be described with reference to FIGS. 21 to 23. FIG. 21 is a view for explaining an example of process mode transition. Since the "high speed" mode is set in all processing units as the initial process mode in this embodiment, the image quality level is 3. In the above-described first case, since the packet has arrived at the combining unit 1630 before the defined time, the process time required by the processing units needs to be longer. To do this, the process mode of the processing unit 1622 is changed from the current "high speed" to "high image quality". This change further improves the image quality of the video tile and slows down the processing. On the other hand, in the above-described second case, since the packet has arrived at the combining unit 1630 after the defined time, the process time required by the processing units needs to be shorter. To do this, processing of the processing unit 1620 is prohibited. This state is represented by "OFF" in FIG. 21. This change speeds up the processing, although the image quality of the video tile becomes poorer. The image quality level may be changed step by step or by different widths based on the calculated difference. For example, if the calculated difference exceeds the upper limit value by a predetermined value or more, the settings of the processing units are changed to raise the image quality level by two steps.

Note that the process path may be changed instead of setting the processing unit 1620 to "OFF". This will be described with reference to FIG. 22. FIG. 22 is a view for explaining another example of process mode transition. At image quality level 3, image quality enhancement processing is executed through the path of the processing units 1620, 1621, and 1622. To increase the process speed at this image quality level, the path is changed to that including the processing units 1621 and 1622. That is, the path is changed not to include the processing unit 1620, thereby speeding up the processing.

The process mode transition is not limited to this example. FIG. 23 is a view for explaining still another example of process mode transition. In this example, settings are done to preferentially cause the processing units 1620, 1621, and 1622 to execute image quality enhancement processing in this order. A case in which the image quality level is lowered will be described below, although the same applies to a case in which the image quality level is raised. From image quality level 0 to 2, the process mode of the processing unit 1620 is degraded while maintaining the processing units 1621 and 1622 in the "high image quality" mode. When the process mode of the processing unit 1620 cannot be degraded any more, the process mode of the processing unit 1621 is degraded from image quality level 3 to 4 while maintaining the processing unit 1622 in the "high image quality" mode. Finally, when the process mode of the processing unit 1621 cannot be degraded any more, the process mode of the processing unit 1622 is degraded from image quality level 5 to 6.

It is thus possible to designate the processing units which should preferentially execute image quality enhancement processing.

Figure 22:
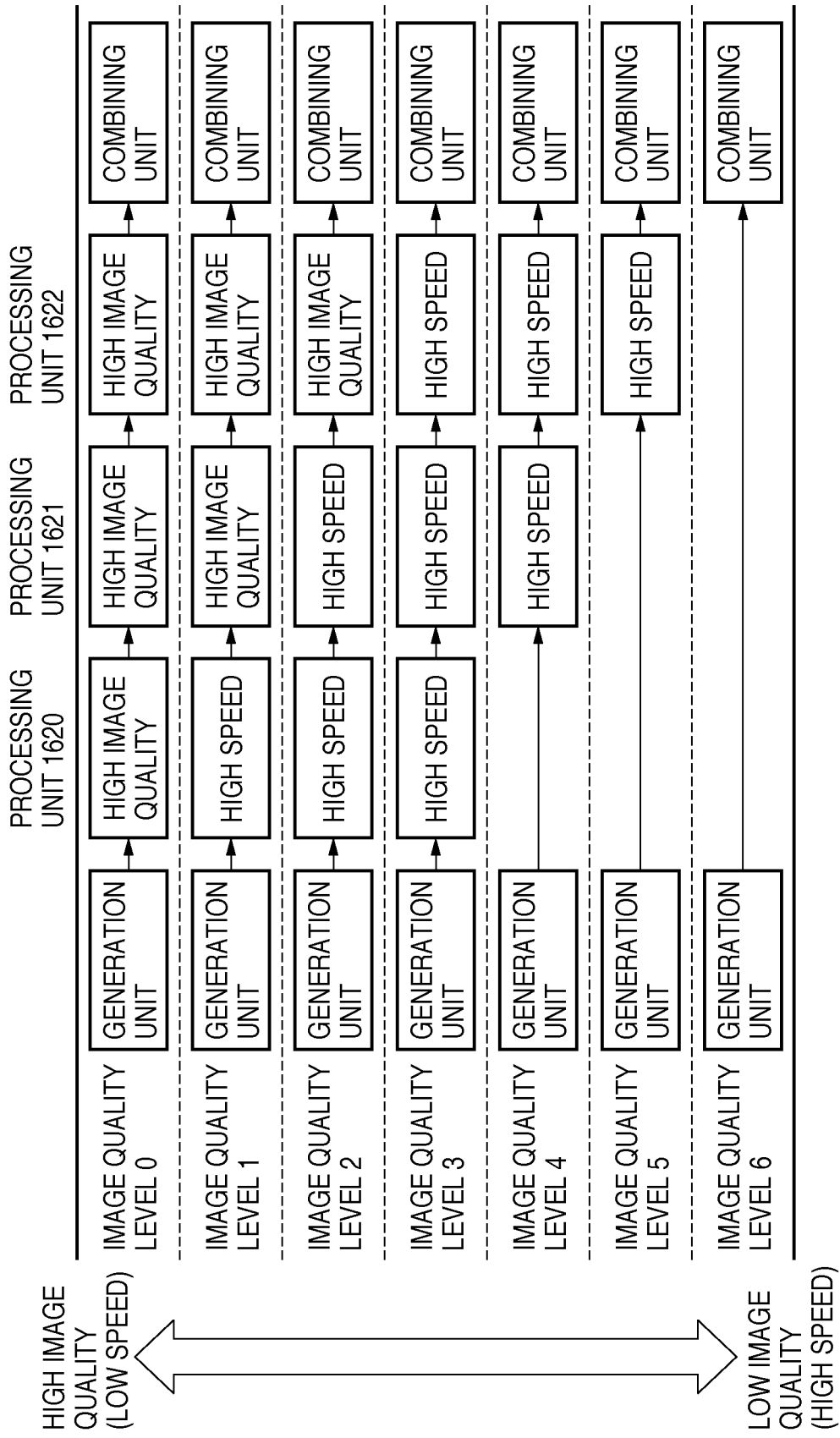
FIG. 22 is a view for explaining another example of process mode transition according to the fifth embodiment of the present invention.
Figure 23:
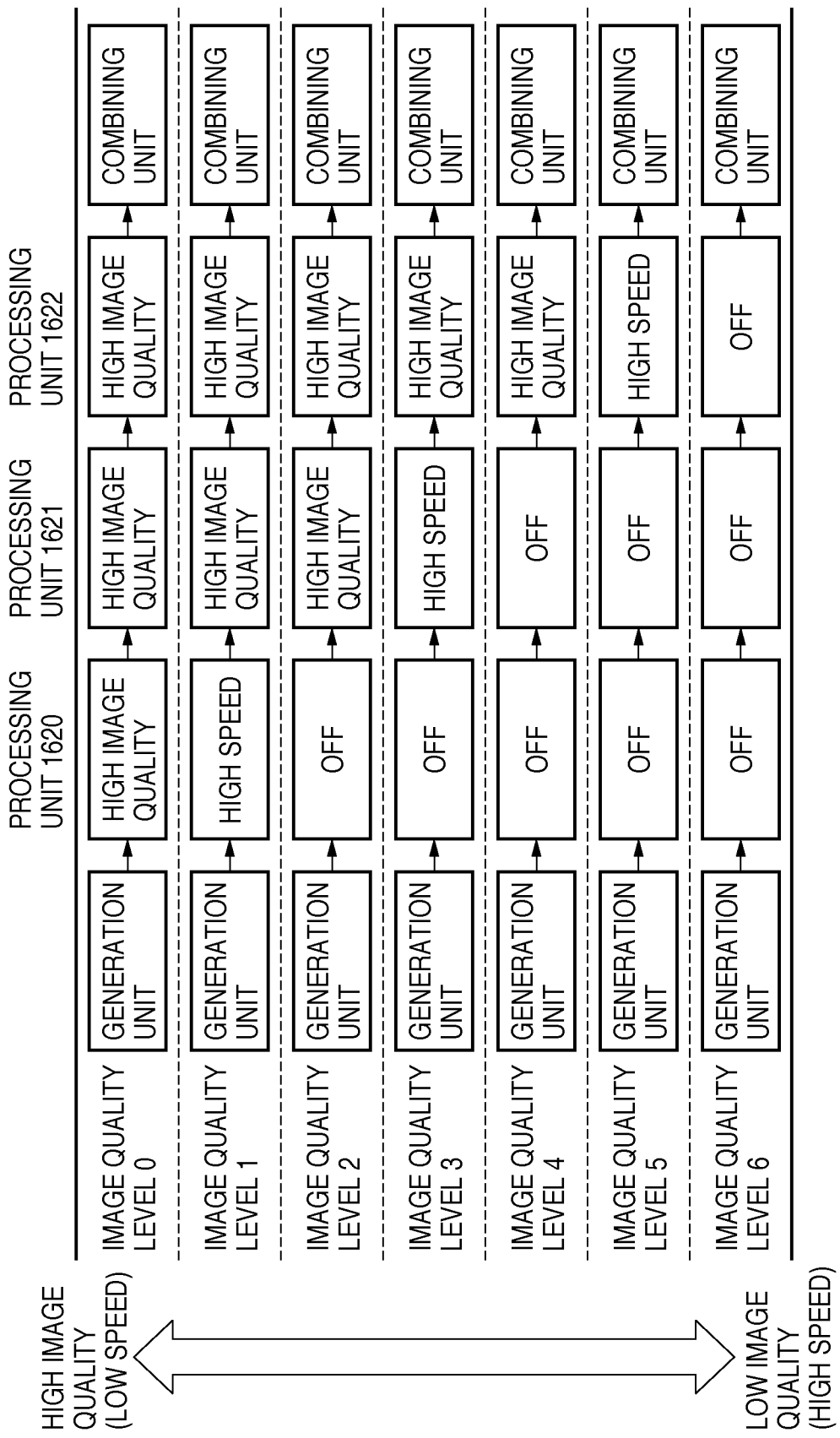
FIG. 23 is a view for explaining still another example of process mode transition according to the fifth embodiment of the present invention.

The process mode transition is not limited to the examples shown in FIGS. 21 to 23. A priority may be defined more specifically for each mode of each processing unit.

Referring back to FIG. 20, the description of the flowchart will be continued. In step S2010, the packetization unit 1614 generates the command packet 1800 based on the contents of the above-described change by the process determination unit 1613, and transmits it to each processing unit. Each processing unit receives the command packet 1800 and changes its process mode in accordance with the contents of the command. Alternatively, the packetization unit 1614 changes the packet path 1710 in the header 1701 added to the subsequent video tile packet 1900 to change the path based on the contents of the above-described change by the process determination unit 1613.

In step S2011, when video tiles corresponding to one frame have been received, the tile combining unit 1632 decompresses the frame and displays it on the video display unit 1634 at the time designated by the timestamp 1713.

In step S2012, the packetization unit 1614 judges whether the video tile packets 1900 of one frame have been transmitted to the reception unit. If the video tile packets have not been transmitted yet ("NO" in step S2012), the process returns to step S2005 to generate and transmit a new video tile packet 1900. If the video tile packets have been transmitted ("YES" in step S2012), the process advances to step S2013.

In step S2013, the packetization unit 1614 judges whether all frames of the video data have been transmitted. If an untransmitted frame remains ("NO" in step S2013), the process returns to step S2004 to determine the timestamp 1713 to be used for the next frame. If all frames have been transmitted ("YES" in step S2013), the processing ends after the video display unit 1634 has displayed all frames.

As described above, according to this embodiment, it is possible to adjust the arrival time of the video tile packet 1900 at the combining unit 1630. This allows preventing disorder in a video or sound caused by underflow or buffer overflow.

Sixth Embodiment

As an information processing apparatus according to the sixth embodiment of the present invention, a packet processing apparatus for processing packetized moving image data (video data) will be described below as an example.

<System Arrangement>

Figure 24:
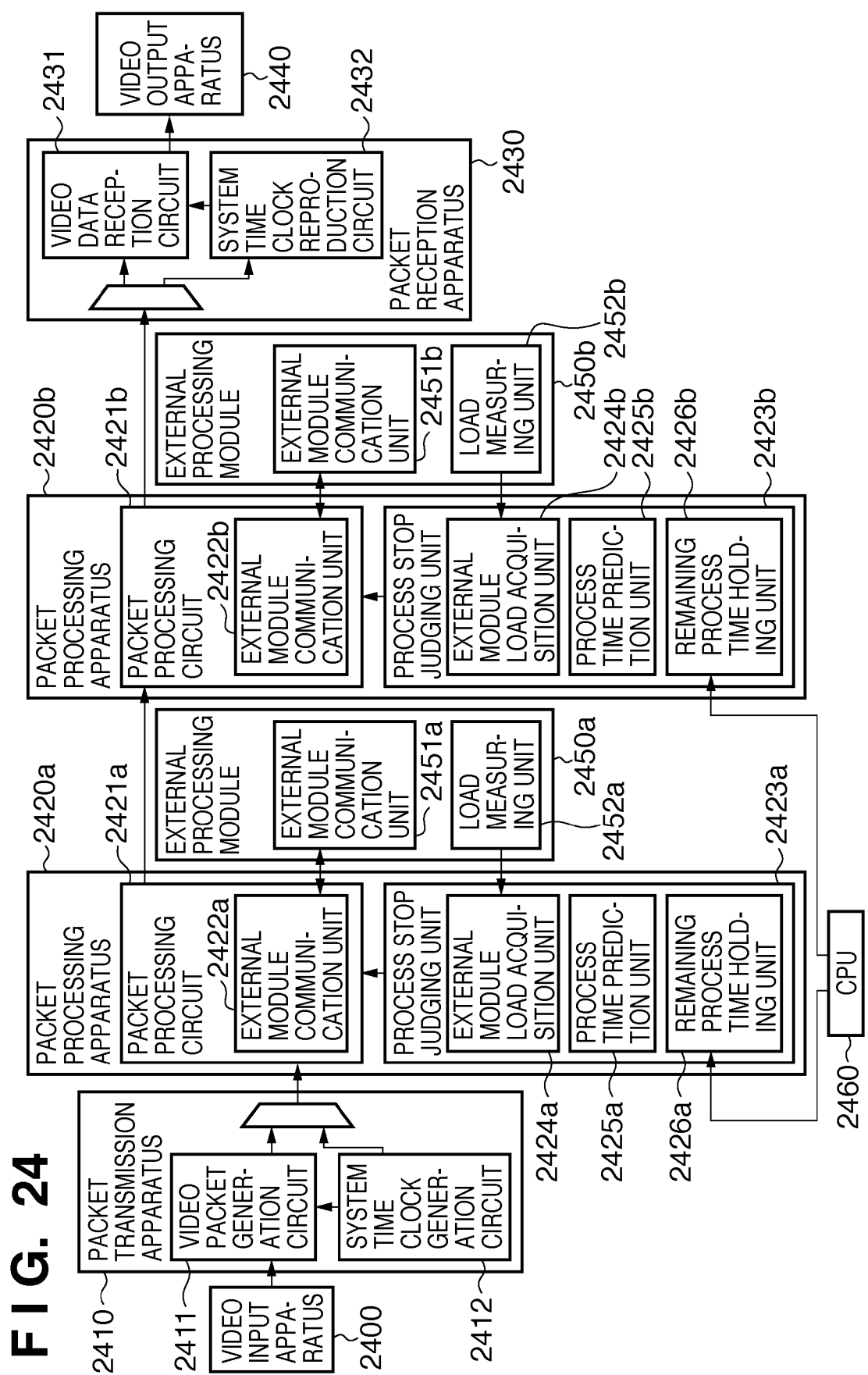
FIG. 24 is a block diagram showing the internal arrangement of a packet processing apparatus and an external processing module according to the sixth embodiment of the present invention.

FIG. 24 is a block diagram showing the arrangement of a system including a packet processing apparatus according to the sixth embodiment.

A video input apparatus 2400 is an apparatus such as a video camera which acquires an external video and outputs it as digital or analog video data. A packet transmission apparatus 2410 receives the video data input from the video input apparatus 2400 and packetizes and outputs it. Packet processing apparatuses 2420a and 2420b perform image processing such as noise removal and edge enhancement for each frame image contained in the video data. FIG. 24 illustrates the two packet processing apparatuses 2420a and 2420b connected in series. However, the number of packet processing apparatuses is not particularly limited as far as at least one packet processing apparatus is included. A packet reception apparatus 2430 receives the packetized video data input from the packet processing apparatus 2420b and outputs it as a digital or analog video signal. A video output apparatus 2440 is an apparatus such as a liquid crystal monitor which outputs, as a video, the received digital or analog video signal.

Figure 26:
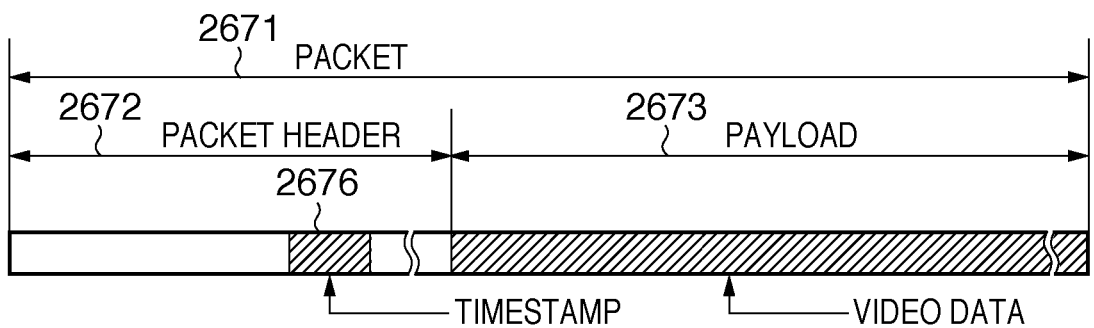
FIG. 26 is a view showing a packet structure according to the sixth embodiment of the present invention.

More specifically, a video packet generation circuit 2411 in the packet transmission apparatus 2410 receives video data from the video input apparatus 2400 and packetizes and transmits it. At this time, the packet transmission apparatus 2410 generates a timestamp based on a time indicated by a system time clock generation circuit 2412 and adds the timestamp to the header of the packet (FIG. 26). On the other hand, a video data reception circuit 2431 in the packet reception apparatus 2430 receives the packet and transmits the video data to the video output apparatus 2440 when a time reproduced by a system time clock reproduction circuit 2432 matches the time represented by the timestamp in the header of the packet. To enable system time clock reproduction by the system time clock reproduction circuit 2432, the system time clock generated by the system time clock generation circuit 2412 is periodically transmitted as a packet.

<Apparatus Arrangement>

The internal arrangement of the packet processing apparatus 2420a and an external processing module 2450a connected to the packet processing apparatus 2420a will be described below in more detail. The packet processing apparatus 2420b and an external processing module 2450b are the same as the packet processing apparatus 2420a and the external processing module 2450a, and a description thereof will be omitted.

As shown in FIG. 24, the packet processing apparatus 2420a includes a packet processing circuit 2421a which controls input/output of a packet, and a process stop judging unit 2423a which controls processing in the packet processing circuit 2421a. The packet processing circuit 2421a requests the external processing module 2450a for executing predetermined image processing such as noise removal and edge enhancement to perform the image processing, and receives the process result.

The process stop judging unit 2423a has a function of instructing the packet processing circuit 2421a to stop the image processing request to the external processing module 2450a in accordance with a judging condition to be described later.

A remaining process time holding unit 2426a included in the process stop judging unit 2423a holds a value representing a process time in which the packet output from the packet processing circuit 2421a can arrive at the packet reception apparatus 2430 until the time indicated by the timestamp. In the following explanation, a CPU 2460 presets the value to be held by the remaining process time holding unit 2426a. However, the value may be held as an initial value without using the CPU 2460. Alternatively, the value may be updated any time during packet processing.

<Operation of Apparatus>

A case will be described below in which each of the packet processing circuits 2421a and 2421b normally ends packet processing within 100 cycles. In this case, the packet transmission apparatus 2410 is set to designate, as the timestamp in the header of a packet, a time 200 cycles after the transmission start time. That is, each packet needs to arrive at the packet reception apparatus 2430 200 cycles after it is sent from the packet transmission apparatus 2410 in the system.

The explanation will be made assuming that "100 (cycles)" and "0 (cycle)" are set in the remaining process time holding units 2426a and 2426b, respectively. More specifically, when the packet processing circuits 2421a and 2421b output a packet, times obtained by subtracting the current time from the timestamp recorded in the packet must be 100 cycles and 0 cycle. If these conditions are satisfied, the packet can arrive at the packet reception apparatus 2430 until the time represented by the timestamp.

Figure 25:
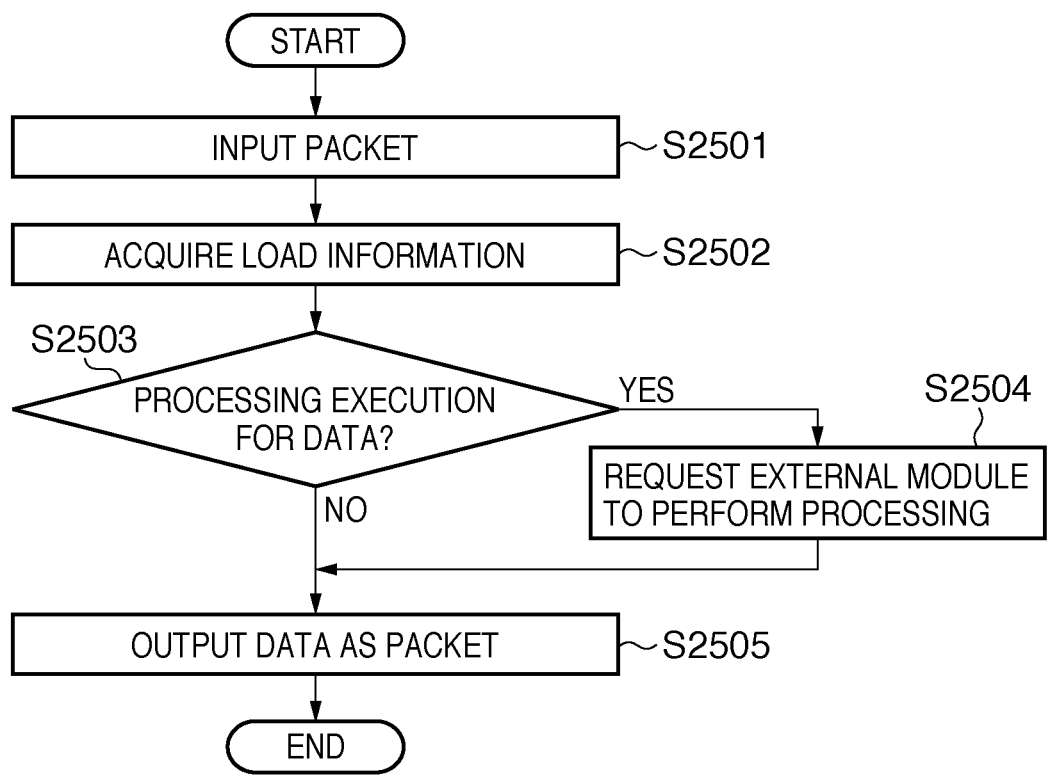
FIG. 25 is a flowchart illustrating the operation of the packet processing apparatus according to the sixth embodiment of the present invention.

FIG. 25 is a flowchart illustrating the operation of the packet processing apparatus 2420a. Note that the following processing is executed for each of a plurality of packets continuously input.

In step S2501, the packet processing circuit 2421a in the packet processing apparatus 2420a receives a packet input from the packet transmission apparatus 2410.

In step S2502, the process stop judging unit 2423a in the packet processing apparatus 2420a causes an external module load acquisition unit 2424a to acquire load information from a load measuring unit 2452a in the external processing module 2450a. The load information indicates information highly correlated with a time required for predetermined image processing in the external processing module 2450a.

In step S2503, the process stop judging unit 2423a in the packet processing apparatus 2420a determines based on the load information acquired in step S2502 whether to execute image processing for the data in the packet received in step S2501. That is, a value (time) obtained by subtracting the current time from the timestamp recorded in the packet must be larger than the value stored in the remaining process time holding unit 2426a when transmitting the packet to the succeeding packet processing apparatus 2420b, as described above.

In this case, a process time necessary when requesting the external processing module 2450a to execute processing is predicted based on the acquired load information in, for example, the following way. For example, if the external processing module 2450a is the main memory controller, a queue length Lq and average arrival rate $\lambda$ of a command that waits for memory access are acquired as load information.

Assume that the external processing module 2450a is the main memory controller, the average service time is $(1/\mu)$, and the access interval and service time for the main memory controller can be approximated by an exponential distribution. In this case, the average process time is $Lq/\lambda+(1/\mu)$ based on the queuing theory. This value is usable as the predicted value of the process time necessary when requesting the external processing module 2450a to execute processing.

Based on a thus derived predicted value, the process stop judging unit 2423a adds the predicted value to the value stored in the remaining process time holding unit 2426a. If the sum is larger than the timestamp of the packet, the process stop judging unit 2423a notifies the packet processing circuit 2421a of stop of processing. To request processing, the process advances to step S2504. To stop processing, the process advances to step S2505.

In step S2504, the packet processing circuit 2421a requests the external processing module 2450a to execute predetermined image processing for the data included in the packet (processing request unit). This is implemented by communicating image data as the target of predetermined image processing to the external processing module 2450a via an external module communication unit 2422a.

In step S2505, the data is packetized and transmitted to the succeeding packet processing apparatus 2420b. That is, if it is determined in step S2503 to request processing of a packet, the processed packet is transmitted. If it is determined in step S2503 to stop processing of a packet, the packet input from the packet transmission apparatus 2410 is directly transmitted.

As described above, according to the packet processing apparatus of the sixth embodiment, control is done to stop processing in accordance with the load state of the external processing module. This allows each packet to arrive at the packet reception apparatus at the time represented by the timestamp.

Seventh Embodiment

As an information processing apparatus according to the seventh embodiment of the present invention, a data processing system for processing packetized video data will be described below as an example.

<System Arrangement>

Figure 27:
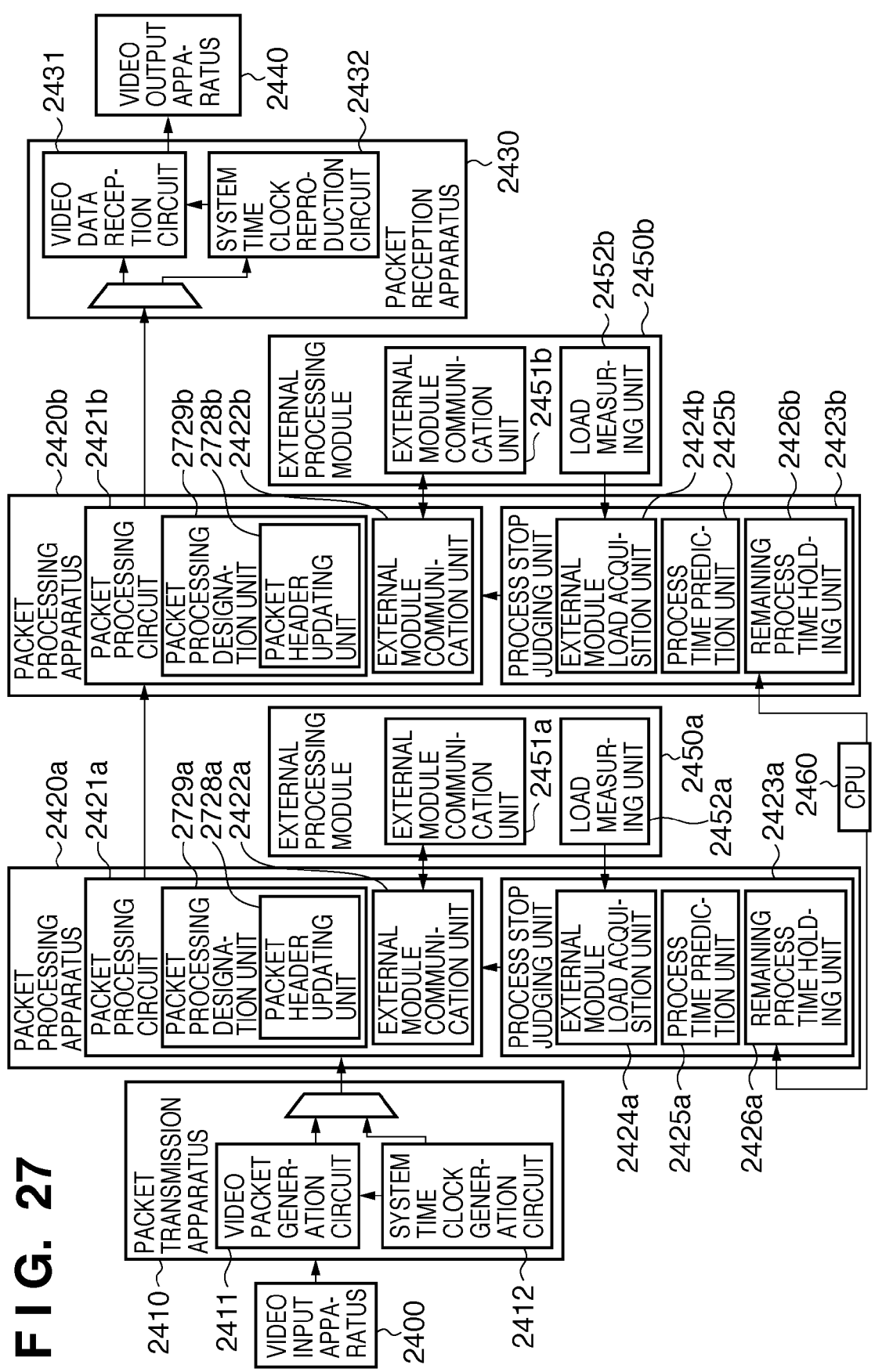
FIG. 27 is a block diagram showing the internal arrangement of a packet processing apparatus and an external processing module according to the seventh embodiment of the present invention.

FIG. 27 is a block diagram showing the arrangement of a system including a packet processing apparatus according to the seventh embodiment. FIG. 27 is different from the sixth embodiment in that a packet processing circuit 2421a further includes a packet processing designation unit 2729a. The remaining apparatuses and the units in the apparatuses are almost the same as in the sixth embodiment, and a description thereof will not be repeated.

Figure 28A:
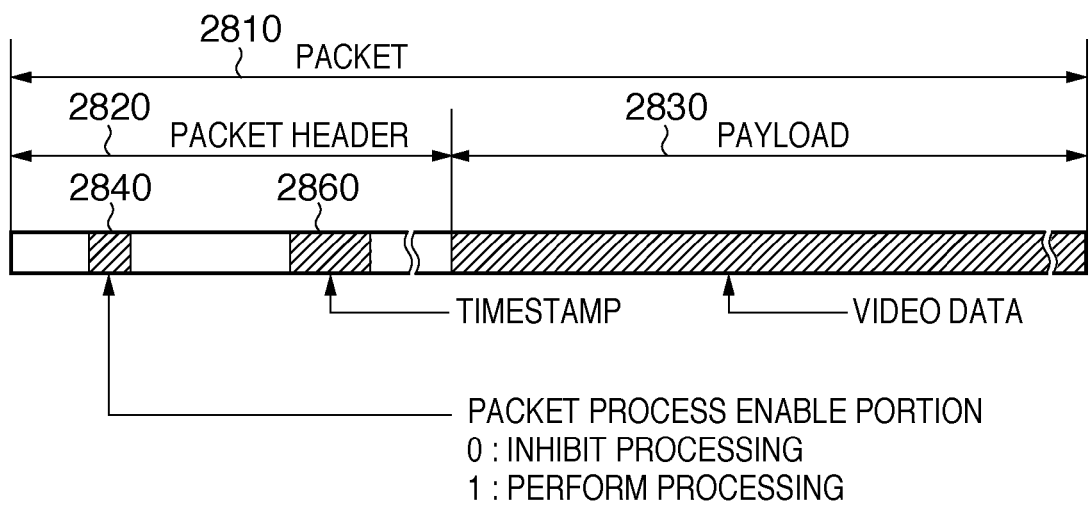
FIGS. 28A and 28B are views showing structures of a packet according to the seventh embodiment of the present invention.
Figure 28B:
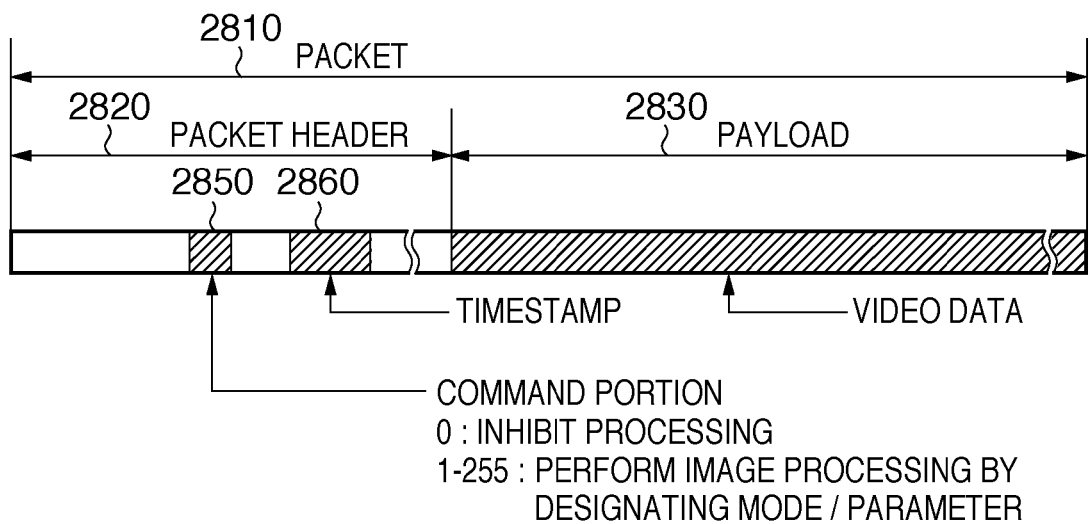
Figure 30:
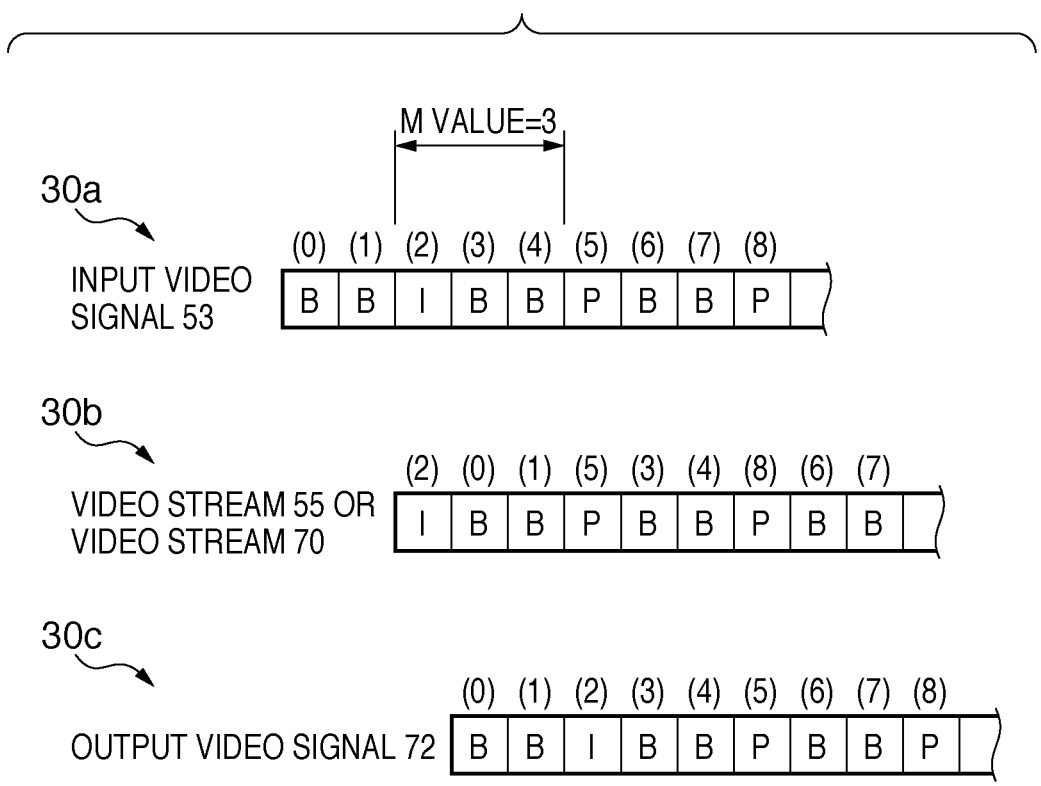
FIG. 30 is a view for explaining picture order change in the conventional moving image compression/decompression system.
Figure 31:
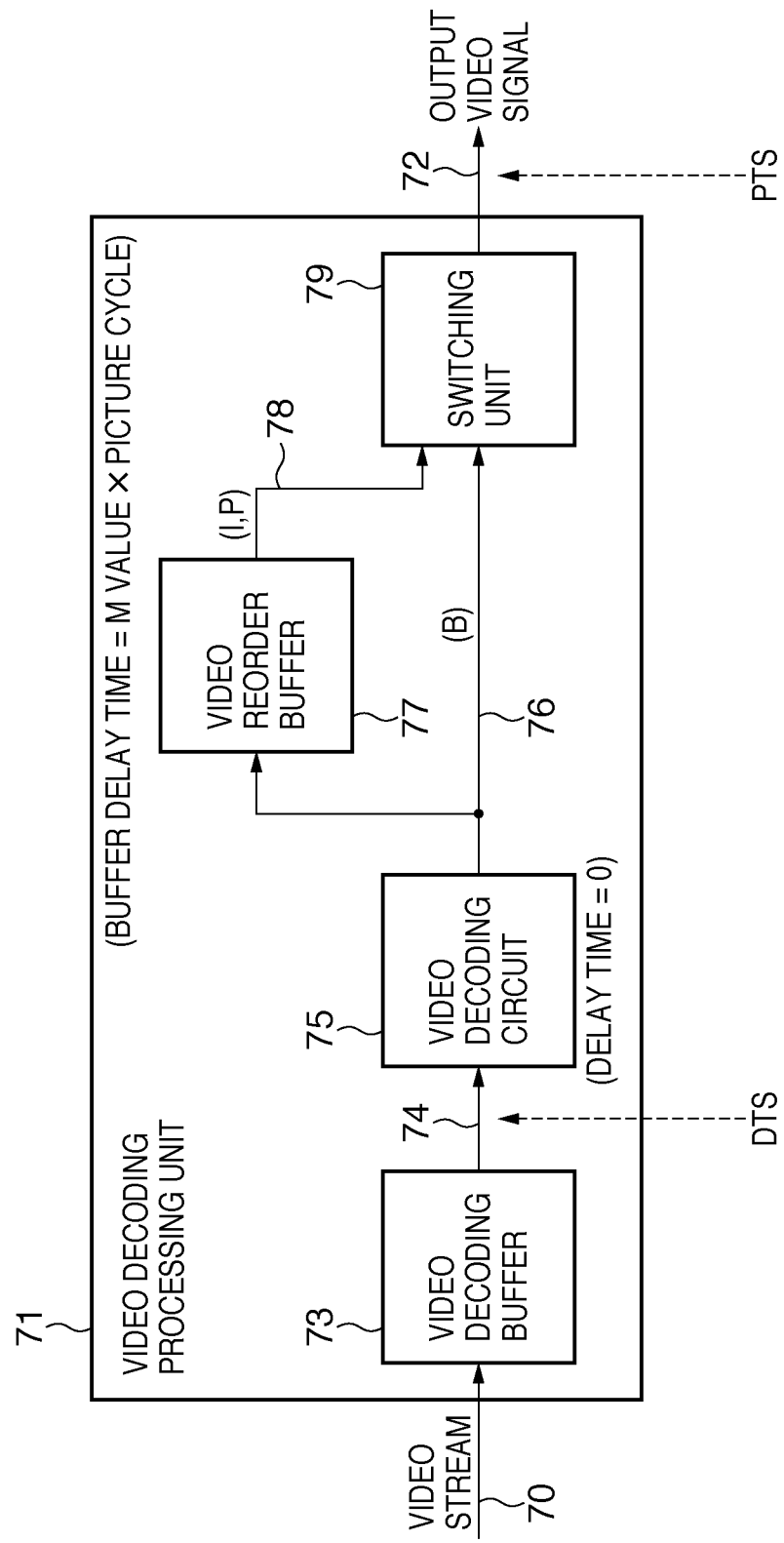
FIG. 31 is a view for explaining a timestamp in the conventional moving image compression/decompression system.
Figure 32:
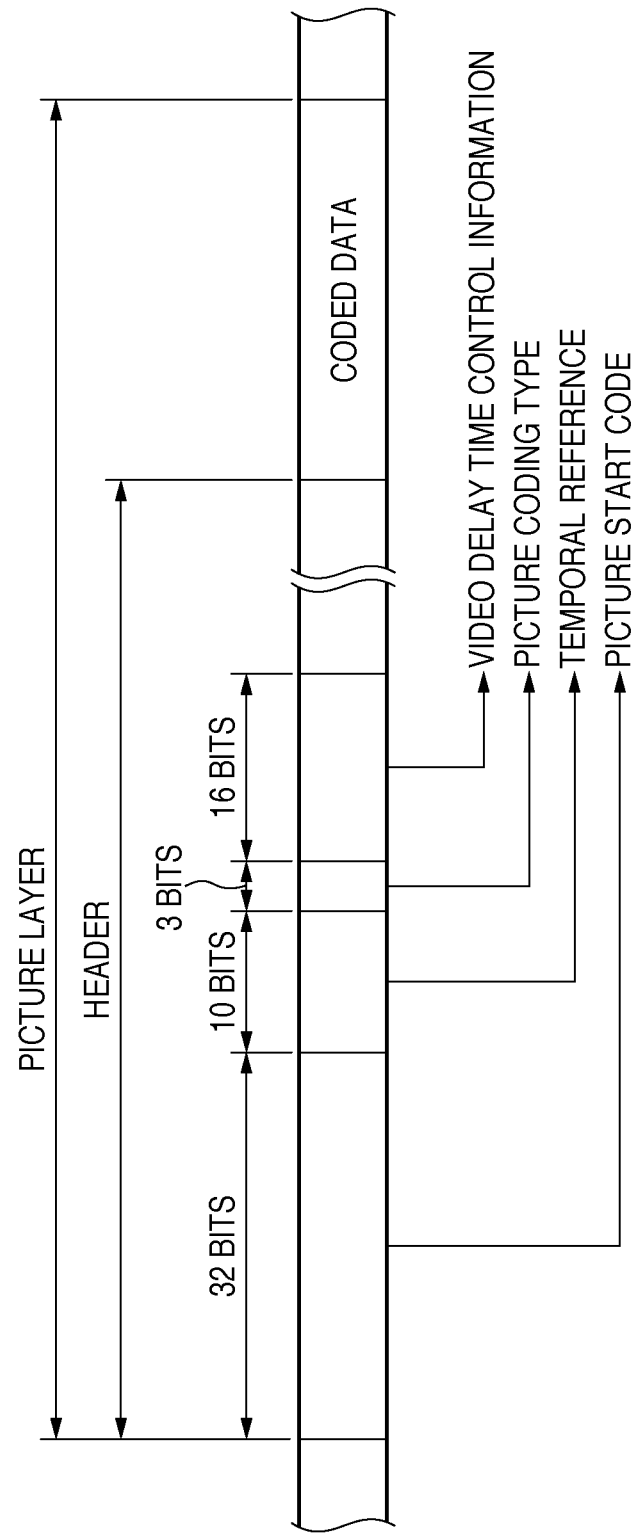
FIG. 32 is a view showing header information in the conventional moving image compression/decompression system.
Figure 33:
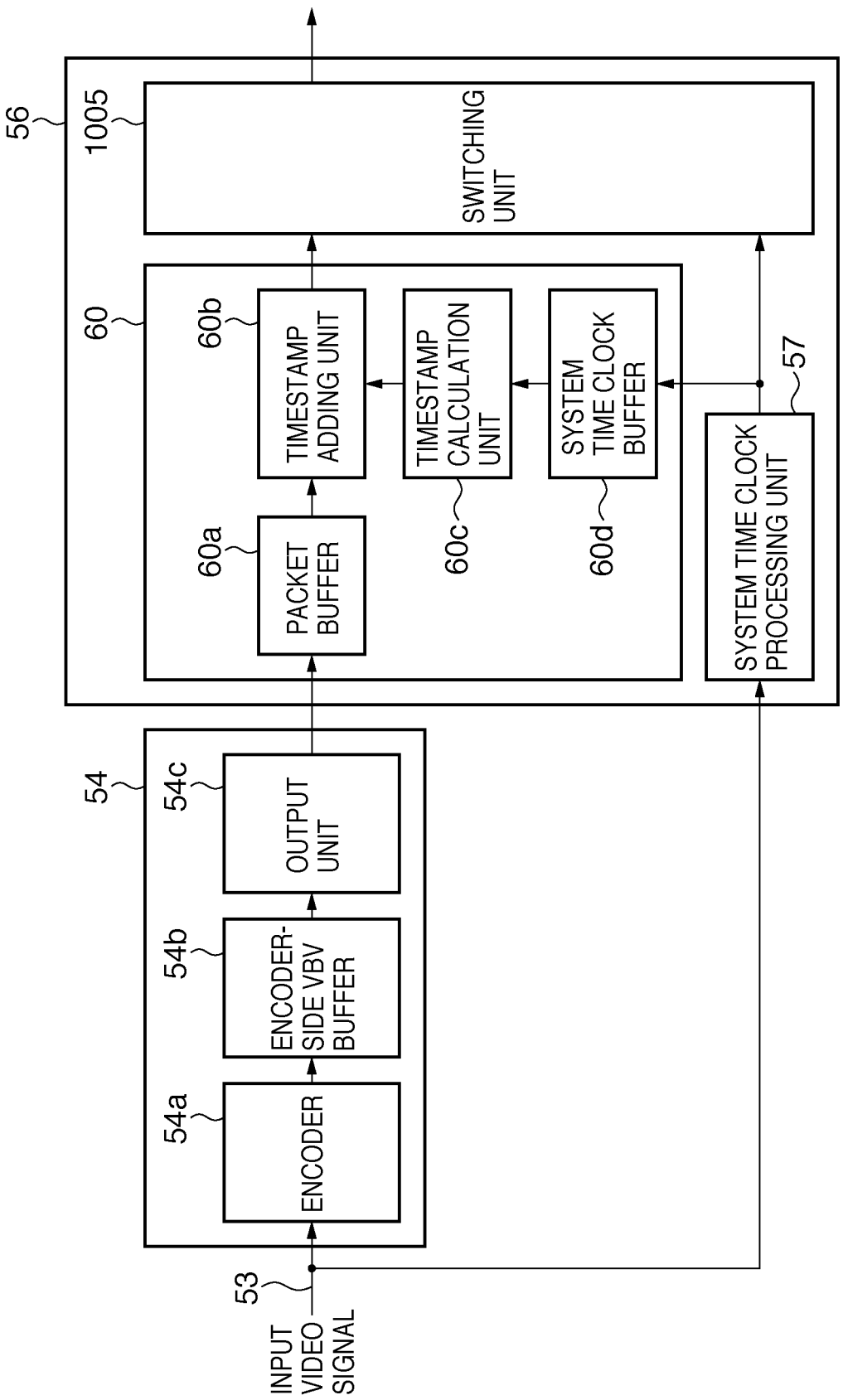
FIG. 33 is a block diagram showing the functional arrangement of a conventional timestamp adding apparatus.

FIGS. 28A and 28B are views showing structures of a packet. Upon receiving a processing stop notification from a process stop judging unit 2423a (determination unit or second determination unit), the packet processing designation unit 2729a in the packet processing circuit 2421a causes a packet header updating unit 2728a to change the header of the target packet. More specifically, "0" indicating prohibition is written (added) in a packet process enable portion 2840 (permission information) in a packet header 2820, thereby prohibiting at once a packet processing apparatus 2420a and a succeeding packet processing apparatus 2420b from executing processing (FIG. 28A) (adding unit or second adding unit).

As another implementation, the packet header updating unit 2728a changes a command portion 2850 including a packet processing command for each packet processing apparatus, thereby prohibiting, for example, only the packet processing apparatus 2420b from executing processing.

More specifically, permission/prohibition of processing in each packet processing apparatus may be designated by one bit. Alternatively, to limit the process contents, eight bits (0 to 127) may be assigned to each packet processing apparatus to designate the level of processing. For example, "0" indicates processing prohibition, and "1" to "127" indicate processing levels.

The packet processing circuit 2421a transmits the rewritten packet to the packet processing apparatus 2420b of the succeeding stage. Upon receiving the packet, the packet processing apparatus 2420b confirms the packet process enable portion 2840. When the packet process enable portion 2840 is "0", the packet processing apparatus 2420b transmits the packet to a packet reception apparatus 2430 without any processing. The packet processing apparatus 2420b also confirms the command portion 2850. If the processing command for the packet processing apparatus 2420b in the command portion 2850 is "0", the packet is sent to the packet reception apparatus 2430 of the succeeding stage without any processing.

As described above, according to the packet processing apparatus of the seventh embodiment, control is done to stop processing in accordance with the load state of the external processing module. Especially, embedding information representing permission/prohibition of processing in the header of each packet enables the apparatus of the succeeding stage to more easily judge whether or not to execute processing.

Other Embodiments

The objects of the present invention are also achieved by supplying a computer-readable storage medium which records software program codes to implement the functions of the above-described embodiments to a system or apparatus. The objects are also achieved by causing the computer (or CPU or MPU) of the system or apparatus to read out and execute the program codes stored in the storage medium.

In this case, the program codes themselves read out from the storage medium implement the functions of the above-described embodiments. The storage medium that stores the program codes constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-156992, filed Jun. 16, 2008, 2008-189043, filed Jul. 22, 2008, 2008-189044, filed Jul. 22, 2008, and 2008-195305, filed Jul. 29, 2008, which are hereby incorporated by reference herein in their entirety.

What is claimed is:

1. An information processing apparatus comprising:
 a reception unit adapted to receive a packet formed by dividing data from another apparatus;
 a processing unit adapted to perform predetermined processing for the received packet to improve quality of the data;
 a measuring unit adapted to measure an elapsed time from a start of the processing;
 a transmission unit adapted to transmit the packet that has undergone the processing to a succeeding apparatus; and
 a holding unit adapted to hold a process time permissible for the processing,
 wherein if the elapsed time has exceeded the permissible process time before an end of the processing by said processing unit,
 said processing unit stops the processing, and
 said transmission unit transmits, to the succeeding apparatus, one of the received packet and a packet at the time of stop of the processing.

2. The apparatus according to claim 1, further comprising an analysis unit adapted to analyze the received packet and judge whether to perform the processing,
 wherein if said analysis unit has judged not to perform the processing, said processing unit does not perform the processing, and said transmission unit transmits the received packet to the succeeding apparatus.

3. The apparatus according to claim 2, wherein if the elapsed time has exceeded the permissible process time, said processing unit further changes one of the received packet and the packet at the time of stop of the processing to make said analysis unit included in the succeeding apparatus judge not to perform the processing, and said transmission unit transmits the changed packet to the succeeding apparatus.

4. An information processing method of an information processing apparatus, comprising the steps of:
 receiving a packet formed by dividing data from another apparatus;
 performing predetermined processing for the received packet to improve quality of the data;
 measuring an elapsed time from a start of the processing; and
 transmitting the packet that has undergone the processing to a succeeding apparatus, wherein if the elapsed time has exceeded a process time permissible for the processing before an end of the processing in the step of performing predetermined processing, the processing in the step of performing predetermined processing is stopped, and one of the received packet and a packet at the time of stop of the processing is transmitted to the succeeding apparatus in the transmitting step.

5. An information processing apparatus comprising:

a generation unit adapted to generate a packet by dividing data containing a video and sound and adding a timestamp;

one or more processing units adapted to perform predetermined processing for the packet to improve quality of the data in one of a plurality of modes at different process speeds; and a combining unit adapted to combine packets which have undergone the predetermined processing to reconstruct the data, wherein each packet arrives at said combining unit from said generation unit via at least one of said processing units based on a process path set by said generation unit, in a first case in which a value obtained by subtracting a time represented by the timestamp included in the packet that has arrived from a time of arrival of the packet at said combining unit is larger than a first threshold, said at least one of said processing units which have performed the processing switches the mode to a mode at a process speed higher than in the current mode, and performs processing for a packet which arrives at said processing unit later, in a second case in which the value obtained by subtracting the time represented by the timestamp included in the packet that has arrived from the time of arrival of the packet at said combining unit is smaller than a second threshold, said at least one of said processing units which have performed the processing switches the mode to a mode at a process speed lower than in the current mode, and performs processing for a packet which arrives at said processing unit later.

6. The apparatus according to claim 5, wherein a priority associated with the processing is defined for each of said processing units, and in the first case, out of said processing units capable of switching to the mode at the process speed higher than in the current mode, a processing unit having a lowest priority performs the switching, and in the second case, out of said processing units capable of switching to the mode at the process speed lower than in the current mode, a processing unit having a highest priority performs the switching.

7. The apparatus according to claim 5, wherein said processing unit transfers the packet without performing the predetermined processing in a mode at a highest process speed.

8. The apparatus according to claim 5, wherein in the first case, said generation unit changes the process path to exclude at least one of said processing units which have performed the processing for the packet that has arrived at said combining unit.

9. An information processing method of an information processing apparatus, comprising the steps of:

generating a packet by dividing data containing a video and sound and adding a timestamp;

performing predetermined processing for the packet to improve quality of the data in one of a plurality of modes at different process speeds; and combining packets which have undergone the predetermined processing to reconstruct the data, wherein in a first case in which a value obtained by subtracting a time represented by the timestamp included in the packet that has arrived from a time of arrival of the packet in the combining step is larger than a first threshold, the mode is switched to a mode at a process speed higher than in the current mode, and processing is performed for a packet which arrives later in the step of performing predetermined processing, and in a second case in which the value obtained by subtracting the time represented by the timestamp included in the packet that has arrived from the time of arrival of the packet in the combining step is smaller than a second threshold, the mode is switched to a mode at a process speed lower than in the current mode, and processing is performed for a packet which arrives later in the step of performing predetermined processing.

10. A non-transitory computer-readable storage medium storing a program which causes a computer to execute an information processing method of claim 4.

11. A non-transitory computer-readable storage medium storing a program which causes a computer to execute an information processing method of claim 9.

* * * * *